United States Patent
Dueck et al.

(10) Patent No.: US 10,015,078 B2
(45) Date of Patent: Jul. 3, 2018

(54) POLICY-BASED ORDER JEOPARDY MANAGEMENT

(71) Applicant: Oracle International Corporation, Redwood Shores, CA (US)

(72) Inventors: Brian James Dueck, Collingwood (CA); Wen Cui, Mississauga (CA); Sandra Rolanda Leung, Toronto (CA); Daniel Hotung Ho, Thronhill (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 617 days.

(21) Appl. No.: 14/600,169

(22) Filed: Jan. 20, 2015

(65) Prior Publication Data
US 2016/0210684 A1    Jul. 21, 2016

(51) Int. Cl.
| | |
|---|---|
| *H04L 12/721* | (2013.01) |
| *G06Q 30/06* | (2012.01) |
| *H04L 12/58* | (2006.01) |
| *G06Q 10/06* | (2012.01) |
| *G06Q 10/08* | (2012.01) |

(52) U.S. Cl.
CPC ....... *H04L 45/124* (2013.01); *G06Q 10/0633* (2013.01); *G06Q 10/083* (2013.01); *G06Q 30/0635* (2013.01); *H04L 51/046* (2013.01); *H04Q 2213/13345* (2013.01)

(58) Field of Classification Search
None
See application file for complete search history.

(56) References Cited

U.S. PATENT DOCUMENTS

| | | | | |
|---|---|---|---|---|
| 6,813,278 | B1 * | 11/2004 | Swartz | H04L 69/329 370/466 |
| 7,469,219 | B2 * | 12/2008 | Goldberg | G06Q 10/06311 700/14 |
| 7,551,917 | B1 * | 6/2009 | Winner | G06Q 10/06 370/249 |
| 7,720,211 | B1 * | 5/2010 | Winner | G06Q 10/06 379/201.12 |
| 2003/0074463 | A1 * | 4/2003 | Swartz | H04L 29/06 709/230 |

(Continued)

OTHER PUBLICATIONS

Ahmad Naser Abdelrahman, U.S. Appl. No. 13/936,584, filed Jul. 8, 2013.

(Continued)

*Primary Examiner* — Gurkanwaljit Singh
(74) *Attorney, Agent, or Firm* — Potomac Law Group, PLLC

(57) ABSTRACT

An order jeopardy manager is provided that manages order jeopardy. A jeopardy order condition to be applied to an order is received. The jeopardy order condition includes an order state transition path and a jeopardy time threshold. The order state transition path includes zero or more from-states and one or more to-states to define one or more order state transitions. The order is determined to be in jeopardy when the order fails to complete one of the order state transitions within the jeopardy time threshold. A jeopardy notification is generated, responsive to the determining, indicating that the order is in jeopardy.

16 Claims, 38 Drawing Sheets

(56) References Cited

U.S. PATENT DOCUMENTS

| | | | |
|---|---|---|---|
| 2005/0289013 A1* | 12/2005 | Goldberg | G06Q 10/06311 705/7.13 |
| 2007/0226340 A1* | 9/2007 | Hastings | G06Q 10/00 709/226 |
| 2010/0262446 A1* | 10/2010 | Sticker | H04L 45/12 709/227 |
| 2011/0112885 A1 | 5/2011 | Rijhsinghani et al. | |
| 2011/0191383 A1 | 8/2011 | Addala et al. | |
| 2011/0218813 A1 | 9/2011 | Addala et al. | |
| 2011/0218842 A1 | 9/2011 | Addala et al. | |
| 2011/0218921 A1 | 9/2011 | Addala et al. | |
| 2011/0218922 A1 | 9/2011 | Addala et al. | |
| 2011/0218923 A1 | 9/2011 | Addala et al. | |
| 2011/0218924 A1 | 9/2011 | Addala et al. | |
| 2011/0218925 A1 | 9/2011 | Addala et al. | |
| 2011/0218926 A1 | 9/2011 | Addala et al. | |
| 2011/0218927 A1 | 9/2011 | Addala et al. | |
| 2011/0219218 A1 | 9/2011 | Addala et al. | |
| 2012/0089486 A1 | 4/2012 | Mahakian et al. | |
| 2012/0124584 A1 | 5/2012 | Addala et al. | |
| 2012/0150582 A1 | 6/2012 | Dueck | |
| 2012/0150583 A1 | 6/2012 | Dueck et al. | |
| 2012/0150676 A1 | 6/2012 | Dueck et al. | |
| 2012/0150692 A1 | 6/2012 | Dueck et al. | |
| 2012/0150693 A1 | 6/2012 | Dueck et al. | |
| 2013/0197976 A1 | 8/2013 | Mahakian et al. | |
| 2013/0318029 A1 | 11/2013 | Sridharan et al. | |
| 2014/0006216 A1 | 1/2014 | Malapati et al. | |
| 2014/0095249 A1 | 4/2014 | Tarakad et al. | |

OTHER PUBLICATIONS

Paul Hugh Wilkie Bishop, U.S. Appl. No. 13/936,588, filed Jul. 8, 2013.
Ahmad Naser Abdelrahman, U.S. Appl. No. 13/936,567, filed Jul. 8, 2013.
Ben Eng, U.S. Appl. No. 13/936,682, filed Jul. 8, 2013.
Ahmad Naser Abdelrahman, U.S. Appl. No. 13/936,596, filed Jul. 8, 2013.
Paul Hugh Wilkie Bishop, U.S. Appl. No. 13/936,686, filed Jul. 8, 2013.
Ahmad Naser Abdelrahman, U.S. Appl. No. 13/936,607, filed Jul. 8, 2013.
Glenn Dexter Swanson, U.S. Appl. No. 13/936,660, filed Jul. 8, 2013.
Deepankar Dey, U.S. Appl. No. 13/936,667, filed Jul. 8, 2013.
Ahmad Naser Abdelrahman, U.S. Appl. No. 13/936,674, filed Jul. 8, 2013.
Oracle, "Oracle Communications Order and Service Mangement", Concepts, Release 7.2.2, E35415-02, Mar. 2013.

* cited by examiner

200

| Component Name | Component Type |
|---|---|
|  | UI<br>Service<br>Report<br>Other |
| OSM Server | Service |
| JeopardyNotificationEngine | Service |
| SampleOrderTimeoutPlugin | Automation Plugin |
| SampleOrderWarningPlugin | Automation Plugin |
| Base OSM Cartridge | Base Solution Cartridge |
| Design Studio for OSM (OSM DS) | UI |
| XML Import/Export Tool (XMLIE) | Service |
| CMWS Adapter | Service |

Fig. 2

| From\To | Not Started | Waiting | Suspended | Waiting For Revision | Cancelled | Failed | In Progress | Amending | Cancelling | Completed | Aborted |
|---|---|---|---|---|---|---|---|---|---|---|---|
| NotStarted | | | | | | | | | | | |
| Waiting | N/A | | | | | | | | | | |
| Suspended | | | | | | | | | | | |
| WaitingForRevision | N/A | N/A | | | | | | | | | |
| Cancelled | N/A | N/A | | | | | | | | | |
| Failed | | | | | | | | | | | |
| InProgress | N/A | N/A | | | | | | | | | |
| Amending | N/A | N/A | | | | | | | | | |
| Cancelling | N/A | N/A | N/A for Orchestration Order | N/A for Orchestration Order | | N/A for Orchestration Order | N/A for Orchestration Order | N/A for Orchestration Order | N/A for Orchestration Order | N/A for Orchestration Order | |
| Completed | N/A | N/A | N/A | N/A | N/A | N/A | N/A | N/A | N/A | only exists for backward compatibility | N/A |
| Aborted | N/A | N/A | N/A | N/A | N/A | N/A | N/A | N/A | N/A | N/A | N/A |

| | delet e or order | update no_ con text | raise order except ion | proc ess ask | add_o rder_ head | compen sate task | raise_ notific ation | proc ess_ task | suspe nd or der | resum e_ord er | subm it_ task | proces s_time _out | cancel_ order_ at_ndme | fail_o rder_ at_ndme | abort order | resolv e_fall iden | start_ order_ out |
|---|---|---|---|---|---|---|---|---|---|---|---|---|---|---|---|---|---|
| open not_running not_started | O | O | P | R | P | P | R | O | P | P | P | NA | P | P | P | P | P |
| waiting | P | P | P | P | O | P | R | P | P | O | O | O | O | P | O | P | P |
| suspended | P | O | P | P | P | P | R | P | O | P | P | P | O | O | O | P | P |
| waiting_for_ revision | P | O | P | P | P | P | R | O | P | P | O | P | O | O | P | P | P |
| canceled | O | O | O | O | O | O | R | P | P | P | P | P | P | P | P | P | P |
| failed | P | O | P | P | P | O | R | P | P | P | P | O | P | O | O | P | P |
| running in_progress | P | O | R | P | P | P | R | P | P | P | P | O | P | O | P | P | P |
| comp ensati ng amendin g | P | P | P | P | P | P | R | P | P | P | P | P | P | P | P | P | P |
| cancelin g | P | P | P | P | P | P | R | P | P | P | P | R | R | P | P | P | P |
| closed completed | O | O | P | P | P | P | R | P | P | P | P | P | P | P | P | P | P |
| aborted | O | O | P | P | P | P | P | P | P | P | P | P | P | P | P | P | P |

Fig. 4A

|  | Postpone the jeopardy further in the future (start+new>old) | Move the jeopardy earlier in the future (start+new>current and new<old) | Postpone the past jeopardy earlier (start+new<current and new>old) | Move the jeopardy earlier than the current time (start+new<current and new<old) | new<=0 or unspecified (when default=0) |
|---|---|---|---|---|---|
| Update/Revise "duration" before raising the jeopardy (start+current<start+old) | "duration"=new | "duration"=new | N/A | "duration"=new Raise jeopardy (if other condition met) | "duration"=0 Ignore jeopardy thereafter until a new "duration" change |
| Update/Revise "duration" after raising the jeopardy (start+old<current) | "duration"=new (no effect on the past) | N/A | "duration"=new (no effect on the past) | "duration"=new (no effect on the past) | "duration"=0 Ignore jeopardy thereafter until a new "duration" change |

```
<model:orderJeopardy xmlns:xsi="http://www.w3.org/2001/XMLSchema-instance"
 xsi:schemaLocation="http://xmlns.oracle.com/communications/ordermanagement/model
 file:/D:/adeviews/wecui_view_osm_700/OMS/OMS/XMLMetadataHandler/models/orderJeopardy.xsd"
 xmlns:model="http://xmlns.oracle.com/communications/ordermanagement/model"
 name="SampleOrderTimeout"
 namespace="ACTIVATIONComponent">
    <model:description>Sample Order Timeout</model:description>
    <model:priority>1</model:priority>
    <model:enabled>true</model:enabled>
    <model:condition>
        <model:name>null_rule</model:name>
        <model:namespace>ACTIVATIONComponent</model:namespace>
    </model:condition>
    <model:notifyRole>
        <model:name>ActivationUserRole</model:name>
        <model:namespace>ACTIVATIONComponent</model:namespace>
    </model:notifyRole>
    <model:notificationView>
        <model:name>ActivationOrderQueryTask</model:name>
        <model:namespace>ACTIVATIONComponent</model:namespace>
    </model:notificationView>
    <model:policy>
        <model:stateConditions>
            <model:fromState>open.running.in_progress</model:fromState>
            <model:toState>open.not_running.canceled</model:toState>
            <model:toState>closed.completed</model:toState>
            <model:toState>closed.aborted</model:toState>

<model:excludedState>open.running.compensating.canceling</model:excludedState>
            <model:excludedState>open.not_running.suspended</model:excludedState>
            <model:excludedState>open.not_running.failed</model:excludedState>

<model:excludedState>open.not_running.waiting_for_revision</model:excludedState>
        </model:stateConditions>
        <model:threshold xsi:type="model:OrderJeopardyOrderExpressionThresholdType">
            <model:expression>
                <model:orderData>/orderTimeout</model:orderData>
                <model:unit>seconds</model:unit>
                <model:default>P3YOM0DT0H0M0S</model:default>
            </model:expression>
        </model:threshold>
    </model:policy>
</model:orderJeopardy>
```

Fig. 9

```
<model:orderJeopardyByOperational xmlns:xsi="http://www.w3.org/2001/XMLSchema-instance"
    xsi:schemaLocation="http://xmlns.oracle.com/communications/ordermanagement/model
    file:/D:/adeviews/wecui_view_osm_700/OMS/OMS/XMLMetadataHandler/models/orderJeopardy.xsd"
    xmlns:model="http://xmlns.oracle.com/communications/ordermanagement/model"
    name="SampleOrderWarning"
    namespace="ACTIVATIONComponent">
        <model:description>Sample Order Timeout Warning</model:description>
        <!-- priority=1 is always generated by SS as it is a mandatory property that will
definitely be overridden by the system-runtime configuration. -->
        <model:priority>1</model:priority>
        <model:notifyRole>
            <model:name>ActivationUserRole</model:name>
            <model:namespace>ACTIVATIONComponent</model:namespace>
        </model:notifyRole>
        <model:notificationView>
            <model:name>ActivationOrderQueryTask</model:name>
            <model:namespace>ACTIVATIONComponent</model:namespace>
        </model:notificationView>
</model:orderJeopardyByOperational>

<model:extendedOrder xmlns:xsi="http://www.w3.org/2001/XMLSchema-instance"
    xsi:schemaLocation="http://xmlns.oracle.com/communications/ordermanagement/model
    file:/D:/adeviews/wecui_view_osm_700/OMS/OMS/XMLMetadataHandler/models/orderJeopardy.xsd"
    xmlns:model="http://xmlns.oracle.com/communications/ordermanagement/model"
    xsi:type="model:OrderJeopardyExtendedOrderType"
    name="SampleOrderTimeoutExtendedOrder"
    namespace="ACTIVATIONComponent">
        <model:extends>
            <model:orderType>
                <model:name>SampleOrder</model:name>
                <model:namespace>ACTIVATIONComponent</model:namespace>
            </model:orderType>
            <model:orderSource>
                <model:name>SampleOrder</model:name>
                <model:namespace>ACTIVATIONComponent</model:namespace>
            </model:orderSource>
        </model:extends>
        <model:jeopardy xsi:type="model:OrderJeopardyReferenceType">
            <model:name>SampleOrderTimeout</model:name>
            <model:namespace>ACTIVATIONComponent</model:namespace>
        </model:jeopardy>
        <model:jeopardy xsi:type="model:OrderJeopardyReferenceType">
            <model:name>SampleOrderWarning</model:name>
            <model:namespace>ACTIVATIONComponent</model:namespace>
        </model:jeopardy>
</model:extendedOrder>
```

| Business Object Name | OperationalOrderJeopardyNotification |
|---|---|
| Business Object Component Name | Operational Order Jeopardy Notification |
| Business Object Component Parent Name | PolledOperationalNotification (same as PolledNotification without the option of polling once only) |
| Status | New |
| High Volume | No |
| Setup Object | Yes |
| Archive | No |
| Purge | Yes |
| Data Security Required | No |
| Product Use Case Reference | UC_OT_12 UC_IMP_12 |
| Description | The XML schema for order jeopardy definition metadata model |

Attributes

| Name | Type | Sensitive | Description |
|---|---|---|---|
| fromState | A list of Order States | | Timing starts ticking when the order first entering the state(s). |
| toState | A list of Order States | | Timing ends when the order first reaching the state(s) after entering the from-state. |
| excludeState | A list of Order States | | Timing skips when the order first reaching the state(s) after entering the from-state. |
| duration | Duration | | A fixed duration as jeopardy threshold. |
| dataMnemonicPath | Text | Yes | The mnemonic path of the order data representing the jeopardy threshold. |
| dataXPathExpression | Text | Yes | The XPath expression representing the jeopardy threshold. |
| dataListOfOrderDataMnemonic Paths | | | The list of order data order mnemonic path participating in the XPath expression. |
| default | DateTime | | The default value for dateTime when the values of dataMnemonicPath and dataXPath are not specified. |
| useExpectedDuration | Boolean | | If to use the order's expected duration as jeopardy threshold. |
| default2 | Duration | | The default value for dateTime when the value of dataMnemonicPath and dataXPath are not specified. |
| unit | Text (Months, Weeks, Days, Hours, Minutes, Seconds) | | The unit for offset, the values of dataMnemonicPath and dataXPath. |
| offset | Numeric | | The offset to the duration setting. For example, in the case of Activation Order Timeout, if the TimeoutWarning was configured as an order jeopardy definition as well, the jeopardy-duration configuration for the TimeoutWarning jeopardy definition would be /OrderTimeout - 5, where the 5 is the offset. |
| percentage | Percent | | The percent of the duration setting. For example, in the case of Activation Order Timeout, if the TimeoutWarning was configured as an order jeopardy definition as well, the jeopardy-duration configuration for the TimeoutWarning jeopardy definition would be /OrderTimeout * 90%, where the 90 is the percentage. |
| orderType | Text | Yes | The order type |
| orderSource | Text | Yes | The order source |

Fig. 22

| | |
|---|---|
| Business Object Name | Order Jeopardy By Operational Notification |
| Business Object Component Name | Order Jeopardy By Operational Notification |
| Business Object Component Parent Name | Notification |
| Status | New |
| High Volume | No |
| Setup Object | Yes |
| Archive | No |
| Purge | Yes |
| Data Security Required | No |
| Product Use Case Reference | UC_OT_1.2, UC_RJP_2.3 |
| Description | The XML schema for an Organizational order jeopardy definition metadata model. |

| Attributes | | | |
|---|---|---|---|
| Name | Type | Sensitive | Description |
| orderType | Text | Yes | The order type |
| orderSource | Text | Yes | The order source |

POLICY-BASED ORDER JEOPARDY MANAGEMENT

FIELD

One embodiment is directed generally to a computer system, and in particular to a computer system that manages orders.

BACKGROUND INFORMATION

Certain computer systems are used in a number of industries, such as the communications industry, for order management including order entry, order fulfillment, and/or order jeopardy management. Order entry is the process of receiving orders and entering the orders into the computer system, where the orders are stored as one or more entities within the computer system, so that the orders can be electronically managed. Order fulfillment is the process of electronically fulfilling the orders, once the orders have been entered into the computer system. Order fulfillment generally entails one or more of the following steps: validating the order, interfacing the order to a billing system or subsystem, shipping physical goods, scheduling installation of equipment, installing equipment, and activating services. Order fulfillment can also entail other steps not listed that are part of a process of electronically fulfilling an order.

Order jeopardy management can determine when an order is not likely to be able to be processed in accordance with a predetermined timeframe such as a service level agreement ("SLA"). Currently, order jeopardy management solutions may be inflexible and unable to support SLAs that require complex order jeopardy definitions.

SUMMARY

One embodiment is a system that manages order jeopardy. The system receives a jeopardy order condition to be applied to an order. The jeopardy order condition includes an order state transition path and a jeopardy time threshold. The order state transition path includes zero or more from-states and one or more to-states to define one or more order state transitions. The system determines that an order is in jeopardy when the order fails to complete one of the order state transitions within the jeopardy time threshold. The system generates, responsive to the determining, a jeopardy notification indicating that the order is in jeopardy

BRIEF DESCRIPTION OF THE DRAWINGS

FIG. 2 illustrates components of a computer system that can implement an embodiment of the present invention.

FIG. 3 illustrates possible combinations order lifecycle states, in accordance with an embodiment of the invention.

FIG. 4A illustrates an order lifecycle policy, in accordance with an embodiment of the invention.

FIG. 7 illustrates the impact of a jeopardy duration change by order update and/or revision, in accordance with an embodiment of the invention.

FIGS. 9 and 10 illustrate an order jeopardy configuration including an order jeopardy timeout plugin and an order jeopardy warning plugin, in accordance with an embodiment of the invention.

FIG. 20 illustrates an XML schema of an Order Jeopardy Type, according to an embodiment of the invention.

FIG. 22 illustrates an XML schema of an Operational Order Jeopardy Type, according to an embodiment of the invention.

FIG. 24 illustrates an XML schema of an Order Jeopardy By Operational Type, according to an embodiment of the invention.

FIG. 26 illustrates an order jeopardy plugin interface, according to an embodiment of the invention.

DETAILED DESCRIPTION

According to an embodiment, a policy-based order jeopardy management system is provided that can automatically detect when an order is not going to be able to be processed in accordance with applicable service level agreements ("SLAs"). The system takes action in accordance with a jeopardy management policy to, for example, notify interested parties and/or, where defined and if possible, initiate corrective actions to rectify problems so that further SLA violations are avoided such as updating the current order, submitting a revision order that revises the current order, cancelling the order, etc.

Figure 1:
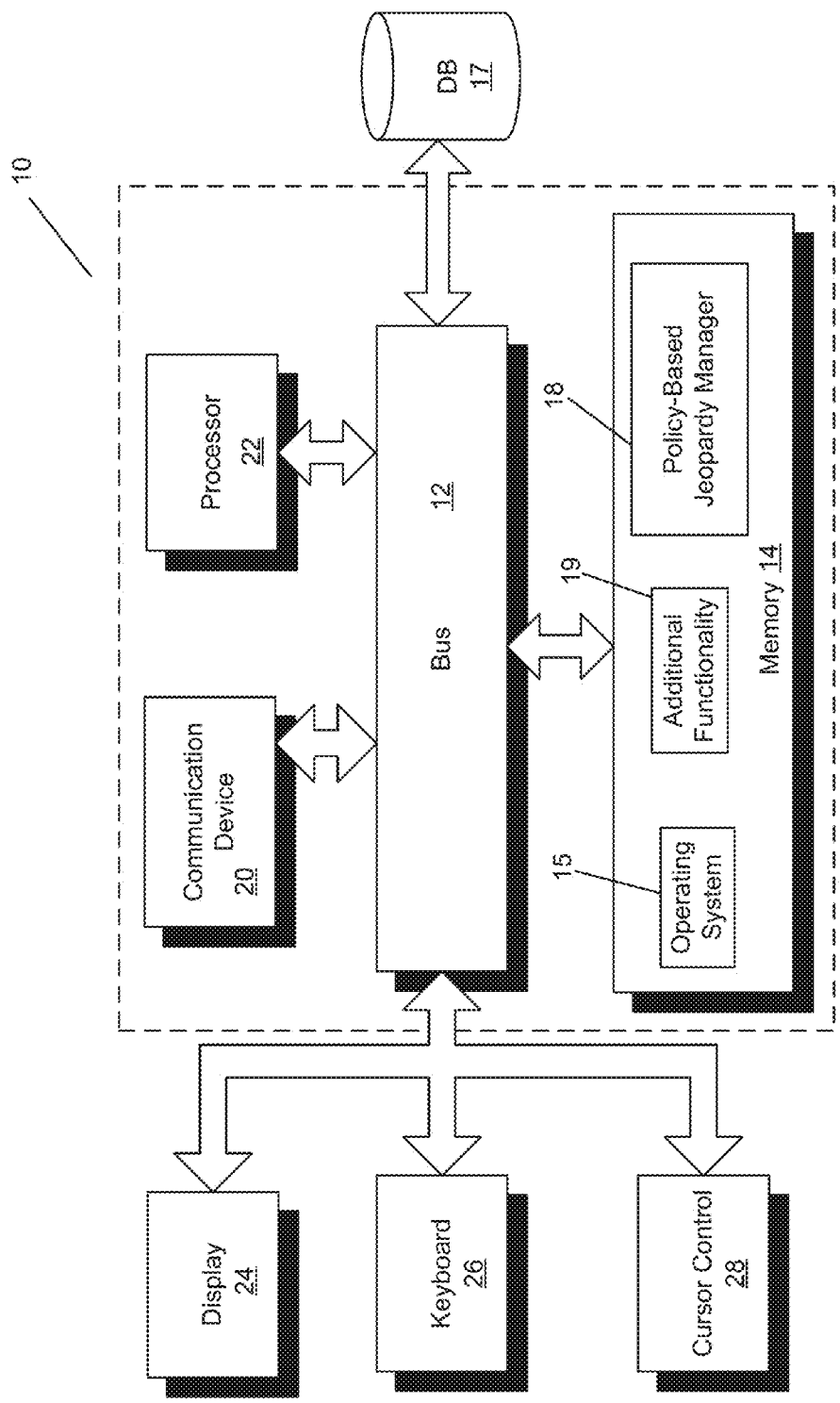
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a policy-based order jeopardy manager 18 that manages order jeopardy, as disclosed in more detail below. System 10 can be part of a larger system. Therefore, system 10 can include one or more additional functional modules 19 to include the additional functionality. For example, functional modules 19 may include modules that provide additional functionality, such as an "Oracle Communications Order and Service Management" product from Oracle Corporation. In another example, functional modules 19 may include enterprise resource planning ("ERP") modules of an ERP system, where an ERP system is a computer system that integrates several data sources and processes of an organization into a unified system.

A database 17 is coupled to bus 12 to provide centralized storage for modules 18 and 19 and store order information, order management information, etc. Database 17 can store data in an integrated collection of logically-related records or files. Database 17 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 automatically detects when an order is not going to be able to be processed in accordance with applicable service level agreements ("SLAs"). System 10 can take action in accordance with a jeopardy management policy to, for example, notify interested parties and/or, where defined and if possible, initiate corrective actions to rectify problems such that further SLA violations are avoided such as, for example: set the order to "failed," update the order, and then resolve the order so that it is no longer "failed;" cancel the order; submit a revision (i.e., submitting a revision order that revises the current order), etc. In some embodiments, system 10 can initiate corrective actions that include, when multiple orders are failing for the same reason, such as an external system failure, suspending some or all orders targeted to that system to avoid generating more failures. In such embodiments, once the external system's problems are resolved, system 10 can resume the suspended orders.

In some embodiments, SLAs and/or other order jeopardy events can be defined by: orders that match criteria {W} must reach one of the states in set {X} from state {Z} within {Y} duration. This definition can also be represented as an Order Jeopardy Condition (or policy) configuration consisting of two components:

Order State Transition Path, for which the order jeopardy is defined (the "from" and "to" states, and any "skipped" states), and Jeopardy Threshold, by which the order jeopardy is "judged".

In some embodiments, the duration/threshold of an Order Jeopardy Condition can be expressed as a reference to order data (e.g., using XPath) that might be provided by an upstream system and/or calculated during the order's life cycle. This jeopardy threshold can be defined at design-time or provided via run-time in the order (e.g., a value defined in the order). For example, an Order Jeopardy Condition can be defined as: orders of type "ActivationOrder" must reach the "Completed" state from any other state within 2 days of the order first reaching the "In Progress" state. In another example, an Order Jeopardy Condition with a timeout that occurs one day before the order timeout can be defined as: orders of type "ActivationOrder" must reach the "Completed" state from any other state within (/_root/timeout−1 day) of the order first reaching the "In Progress" state. In this example, the SLA definition references the order timeout via XPath (/_root/timeout) and includes a subtraction calculation to define the SLA timeout as one day before the order timeout. Dynamic references such as XPath references and calculations can be determined at run-time.

In some embodiments, an Order Jeopardy Condition can be specified at two levels: one that is specified at the order level (Order Jeopardy) and the other at the system level (Operational Jeopardy). These levels can be used to specify a jeopardy threshold type of SLA that is expressed based on the order start time, the current time, and/or a duration (e.g., a constant or an expression).

In some embodiments, system 10 can manage SLAs that are based on progress (e.g., work completed vs work remaining). In some embodiments, system 10 can schedule a notification to be generated for an order at any point during the order's processing and, for example, a jeopardy notification can be scheduled once a particular milestone is complete or when a task or process is complete, providing notice of the progress of the order. Additionally or alternatively, when a particular milestone/task/process is complete, system 10 can compare the amount of work remaining and the amount of time remaining before the order should be complete to determine a confidence level of how likely the order is going to meet an SLA or other jeopardy policy. If system 10 determines that it is unlikely that the SLA or other jeopardy policy will be met, system 10 can increase the priority of the order and/or send a notification upstream to, for example, assist with managing customer communications.

In some embodiments, the Order Jeopardy Condition can also define "skipped" states where the corresponding jeopardy timer is paused while the order is in the "skipped" state. In general, a "from"→"to" order state transition path represents the duration between the first time entering "from" state to the first time reaching "to" state, regardless of any other state changes in between. In some embodiments, the order jeopardy timer starts timing when the order enters the "from" state, pauses when the order moves into the "skipped" state thereafter, and then resumes timing after the order moves to a following non-skipped state. If the order moves to a "to" state directly from the "skipped" state without moving to a following non-skipped state, the order jeopardy timer stops by the "to" state. In some embodiments, certain "from"→"to" order state transition paths may be checked, blocked, and/or flagged by system 10, such as, for example, some of the order state combinations shown in FIG. 3.

FIG. 2 illustrates components of a computer system that can implement an embodiment of the present invention. An order jeopardy management system can comprise the components listed in table 200 including an OSM server, a jeopardy notification engine (or "JeopardyNotificationEngine"), a sample order timeout plugin (or "SampleOrderTimeoutPlugin") (e.g., the sample order jeopardy timeout plugin described in FIG. 8), a sample order warning plugin (or "SampleOrderWarningPlugin") (e.g., the sample order jeopardy warning plugin described in FIG. 11), a base OSM cartridge, a graphical user interface ("GUI") such as Oracle's Design Studio for DSM ("OSM DS" or "Design Studio"), an XML tool such as Oracle's XML Import/Export Application ("XMLIE"), and a Cartridge Management Web Service ("CMWS") Adapter.

In operation, OSM server loads base OSM cartridge and coordinates order fulfillment functions for completing a customer order created in a customer relationship management ("CRM") system, or other order-source system, the order fulfillment functions including jeopardy management, as disclosed herein.

Base OSM cartridge is a software package created in Design Studio to deploy functionality to OSM server. Cartridges contain order metadata such as recognition rules, processes, order states, behaviors, specification, and other entities used for order processing. Cartridges are created with Design Studio, but customized cartridges can be provided that, for example, support integration with other common applications, and pre-configured cartridges can also be provided. Order Jeopardy Conditions (SLAs) can be defined in XML format in OSM cartridges such as base OSM cartridge.

Design Studio is a software application comprising a GUI (e.g., the GUIs shown in FIGS. 12-18) used to design, configure, and/or deploy OSM Order Management cartridges into OSM environments. In some embodiments, Design Studio is based on The Eclipse Foundation's Eclipse Integrated Design Environment ("IDE"). In such embodiments, OSM plug-ins provide the specific screens (editors), validation logic, and cartridge-build functionality that allow users to create and configure OSM cartridges. Design Studio can access OSM cartridges via CMWS Adapter which provides a web service interface to Design Studio. Design Studio can be configured to provide GUIs (e.g., the GUIs shown in FIGS. 11-17) to design, configure, and/or deploy Order Jeopardy Conditions (SLAs). Design Studio can also be configured to provide GUIs (e.g., the GUIs shown in FIGS. 11-17) to design, configure, register, and/or deploy jeopardy plugins (e.g., SampleOrderTimeoutPlugin and SampleOrderWarningPlugin) to OSM server via the web service interface provided by CMWS Adapter.

XMLIE can load order jeopardy settings including Order Jeopardy Conditions (SLAs) into OSM server such as, for example, those manually defined or pre-configured in base OSM cartridge and/or Order Jeopardy Conditions (SLAs) created/configured with Design Studio.

JeopardyNotificationEngine can determine when an order is in jeopardy based on the loaded Order Jeopardy Conditions (SLAs) by, for example, evaluating orders at intervals or other polling methods, such as, for example, those methods described in FIGS. 28 and 29 below. Upon determining that an order is in jeopardy, JeopardyNotificationEngine can generate a notification which can include calling a jeopardy plugin as, for example, described in FIGS. 6 and 8-11 below.

In some embodiments, JeopardyNotificationEngine can generate a notification that an order is in jeopardy and the notification can initiate corrective action to resolve the potential jeopardy, as discussed herein.

FIG. 3 illustrates possible combinations order lifecycle states, in accordance with an embodiment. Table 300 lists "from" states in the left most column, and "to" states on the top most row. Based on an order lifecycle policy and the semantics of the SLA (or Order Jeopardy Condition), some "from"→"to" combinations may not be logical, and some may be ambiguous, e.g. "InProgress"→"NotStarted", or "InProgress"→"InProgress". In table 300, state transition paths that are illogical/impossible/ambiguous for all order types are indicated by "N/A", and state transition paths that are illogical/impossible/ambiguous for a particular order type such as the "Orchestration Order" type are indicated by "N/A for Orchestration Order."

When an Order Jeopardy Condition specifies multiple "from" states, at runtime the state entered first is viewed as the actual "from" state, and when there are multiple "to" states, at runtime the state reached first is viewed as the actual "to" state. Therefore, for multi-state "from"→"to" combinations, the combination can eventually be translated to "<the first entered state>"→"<the first reached state thereafter>" at runtime, and such combinations have similar issue as the single-state "from"→"to" combinations. However, the actual combination may not be known until runtime. Therefore, in some embodiments, illogical combinations are not filtered out at design-time for multi-state "from"→"to" combinations.

Based on table 300, the "illogical" (i.e., N/A) single-state "from"→"to" combinations can be checked/blocked/flagged at design time, such as, for example, when defining an Order Jeopardy Condition using the graphical user interface ("GUI") shown in FIGS. 12-18. Because, as discussed above, not all cases can be determined at design time for multi-state combinations, "illogical" combinations of such multi-state combinations can be ignored at design time.

In some embodiments, additional validation of "from"→"to" combinations can be performed at design time (by, e.g., the GUI shown in FIGS. 12-18), such as, for example:
- "from" state(s) should be empty only when an order jeopardy is based on the absolute date-time when the "to" state(s) is reached (when "from" state(s) is not empty, it implies that the order jeopardy is based on the duration between entering the "from" state and reaching the "to" state thereafter);
- "to" state(s) should never be empty;
- the available "skipped" state set changes as the "from→to" selection changes (for single-state "from"→"to" combinations, only the valid intermediate states should be selectable "skipped" state(s) at design time);
- neither the "from" nor "to" state should be selectable as "skipped" state;
- closed order states (e.g., "Completed" and "Aborted") should never be an option for "skipped" state(s);
- the "skipped" state(s) allows multiple selections (it can also be empty, which indicates "skipping no state").
- when "from" state(s) is empty, the order jeopardy must be absolute date-time based, hence the "skipped" state(s) should be empty too.
- for multi-state "from"→"to" combinations, it is impossible for DS to filter out illogical "from→(skipped)→to" combinations at design-time, it is the designer's responsibility to avoid illogical "from→(skipped)→to" combinations in the design.

In some embodiments, order lifecycle states may be reoccur-able. For example, an order may be able to enter the "In Progress" state, transition to another state, and then transition back to the "InProgress" state. In some embodiments, an Order Jeopardy Condition can be defined from a reoccur-able "from" state to a closed "to" state, such as, for example:
- "InProgress→Completed" ("duration jeopardy for order completion since started"):
- "NotStarted→Completed" ("duration jeopardy for order completion since creation").

In these cases, only the first occurrence of the "InProgress"/"NotStarted" is viewed as the "from" state which starts the corresponding timer. Any other occurrences of "InProgress"/"NotStarted" before "Completed" have no effect on the order jeopardy.

An Order Jeopardy Condition can also be defined from a reoccur-able "from" state to a reoccur-able "to" state that never goes to the "from" state, such as, for example: "NotStarted→InProgress" ("duration jeopardy before an order is started after creation"). In this case, only the first occurrence of the "NotStarted" is viewed as the "from" state starting timer. Any other occurrences of "NotStarted" before "InProgress" have no effect on the order jeopardy.

An Order Jeopardy Condition can also be defined from a reoccur-able "from" state to a reoccur-able "to" state that may go to the "from" state, such as: "Suspended→InProgress" ("duration jeopardy for an order's every suspension"). In this case, every first-occurrence of the "Suspended" after "In Progress" is viewed as the from-state starting timer, and every first-occurrence of the "InProgress" after "Suspended" is viewed as the to-state stopping/resetting the timer. Any other occurrences of "Suspended" between a "Suspended" and "InProgress" have no effect on the order jeopardy.

An Order Jeopardy Condition can also be defined from a "from" state to a "to" state that has skipped state(s), such as: "InProgress→{Cancelled, Completed, Aborted}, with skipped-state(s) as {Cancelling, Suspended, Failed, WaitingForRevision}." In this example, if there is any "un-interruptive" state, like "Cancelling," on which the order jeopardy should be ignored and the timing should be skipped until the order is out of the un-interruptive state, the "un-interruptive" state can be specified as a skipped state in the order jeopardy definition.

Figure 4B:
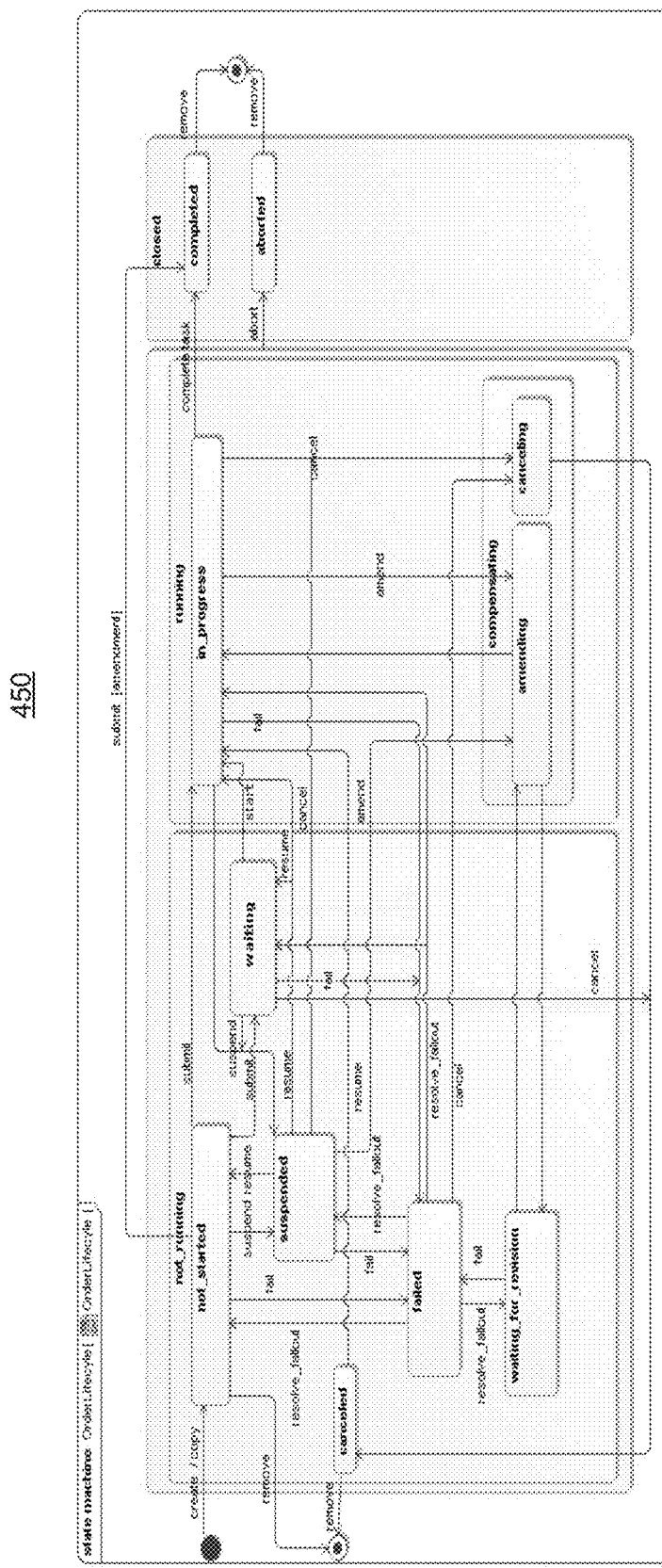
FIG. 4B illustrates an order lifecycle state machine, in accordance with an embodiment of the invention.

FIGS. 4A and 4B illustrate an order lifecycle policy and state machine, respectively, in accordance with an embodiment. Table 400 describes an order lifecycle policy, where the "R" indicates that the transition is required to be allowed; "P" indicates that the transition is prohibited; and "O" indicates that the transition is optional. Order states in the order lifecycle policy are listed in the left most column and top most row of table 400. State machine 450 illustrates various transitions between the order states listed in table 400.

Figure 5:
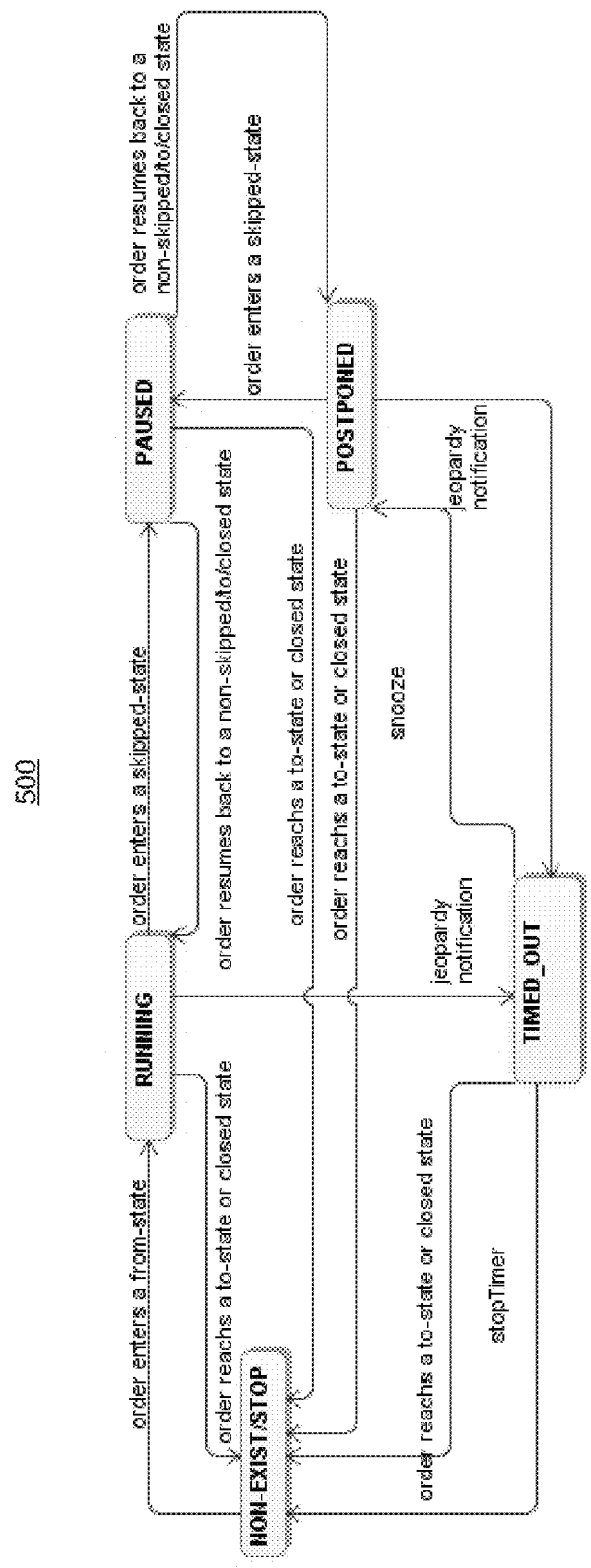
FIG. 5 illustrates a flow diagram of the functionality of policy-based order jeopardy management, in accordance with an embodiment of the invention.

FIG. 5 illustrates a flow diagram of the functionality of policy-based order jeopardy management, in accordance with an embodiment. In one embodiment, the functionality of the flow diagram of FIG. 5, and the functionality of the flow diagrams of FIGS. 6, 8, 11, and 28-30 are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow illustrates an order jeopardy timer which includes the following states: "NON-EXIST/STOP," "RUNNING," "PAUSED," "TIMED_OUT" and "POSTPONED."

Initially, the timer of the order is in the "STOP" state. The timer starts and enters the "RUNNING" state, when the order first enters a "from" state. Timing continues until the order reaches a "to" state, regardless of any order state changes in between, with the following exceptions:
- submitting a revision (i.e., submitting a revision order that revises the current order) resets an order jeopardy that specifies "Reset by a revision submission" in the order jeopardy definition, which acknowledge/deactivates the old to allow the new jeopardy notification, and stops the timer, i.e. the jeopardy management goes back to the "STOP" state (thereafter, if "Amending" is not a "from" state, the jeopardy management stays in the "STOP" state until the order enters a "from" state again; otherwise, if "Amending" is a "from" state, the order then enters the "Amending" state, hence the jeopardy management restarts and enters the "RUNNING" state); and
- submitting an order state transition call to transit the order into a "skipped" state from the "from" state pauses the timer and enters the "PAUSED" state (thereafter, if the order is transited to a following non-skipped state, resumes the timer and continues as usual, i.e. the jeopardy management restarts the timer; otherwise, the timer continues pausing until reaching a "to" state or a closed state (e.g., "Completed" or "Aborted") (while pausing, the timer accumulates the pause-time by each pause during the timer's life cycle)) (for absolute date-time based order jeopardy, the skipped-state(s) should be always empty, so that this step never applies to an absolute date-time based order jeopardy).

If the order reaches a "to" state or "closed" state (e.g., "Completed" or "Aborted") before the jeopardy-duration is reached the timer stops, i.e. the jeopardy management goes back to the "STOPPED" state.

If the jeopardy-duration is reached before the order reaches a "to" state, the jeopardy management enters the "TIMED_OUT" state and an order jeopardy notification goes out.

Figure 6:
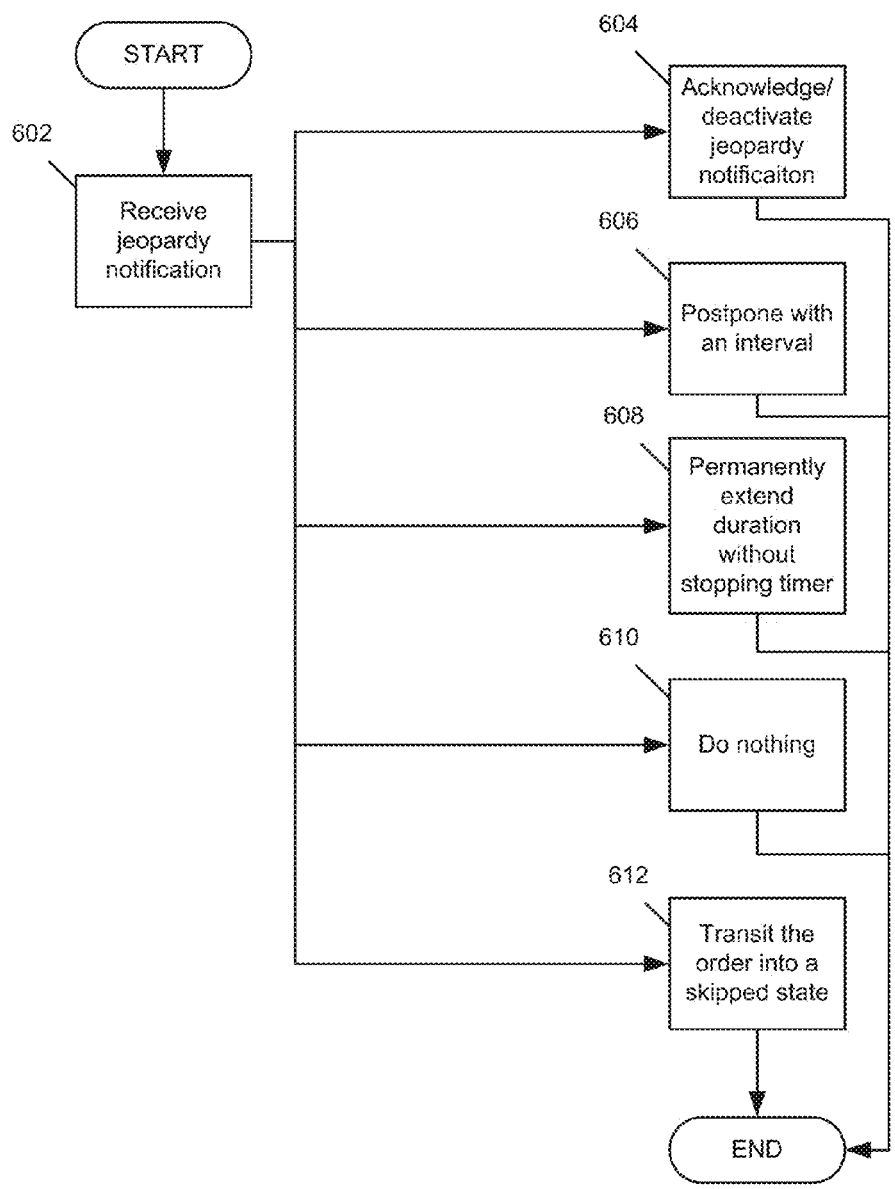
FIG. 6 illustrates a flow diagram of the functionality of a jeopardy notification plugin, in accordance with an embodiment of the invention.

At the same time timing continues, the order jeopardy notification turns "active/old" to stop going out, and the timer's postpone-end should be cleaned/reset if there is existing one;

FIG. 6 illustrates a flow diagram of the functionality of a jeopardy notification plugin, in accordance with an embodiment. The flow begins and proceeds to 602. At 602, the jeopardy notification plugin receives a notification that an order jeopardy has occurred, such as, for example, when a timer reaches the "TIMED_OUT" state as shown in FIG. 5. In response to the order jeopardy, the jeopardy notification plugin can proceed to any of 604-612.

At 604, the jeopardy notification plugin can either acknowledge/deactivate the order jeopardy notification, which clears the old jeopardy notification to allow a new jeopardy notification to be generated in the future, and then stop the timer (i.e., the jeopardy management goes back to the "STOPPED" state shown in FIG. 5). After acknowledging/deactivating the order jeopardy notification, the jeopardy can be handled in various way, such as, for example:

if the handling simply sends out a warning message but doesn't transit the order to a different state, the jeopardy management stays in the "STOPPED" state and waits to restart in the "RUNNING" state until the order enters a from-state again;

if the handling sets the order to "failed," updates the order, and then resolves the order so that it is no longer "failed," the order then re-enters the "from" state, and the jeopardy management restarts in the "RUNNING" state;

if the handling cancels the order, (assuming "Cancelling"/ "Cancelled" is not a "from" state) the jeopardy management stays in the "STOPPED" state and waits to restart in the "RUNNING" state until the order enters a "from" state again (thereafter, if the handling resumes the order, the order then re-enters the "from" state, and the jeopardy management restarts in the "RUNNING" state);

if the handling submits a revision (i.e., submitting a revision order that revises the current order), assuming "Amending" is not a "from" state, the jeopardy management stays in the "STOPPED" state and waits to restart in the "RUNNING" state until the order enters a "from" state again (however, if "Amending" is a from-state, the order then enters the "Amending" state, and the jeopardy management restarts in the "RUNNING" state).

At 606, the jeopardy notification plugin can postpone with an interval, which only temporarily extends the time when the order becomes in jeopardy by the given interval without stopping the timer, and then acknowledge/deactivates the old to allow the new jeopardy notification, i.e. the jeopardy management continues until the order reaches a "to" state.

At 608, the jeopardy notification plugin can permanently extend the jeopardy-duration via an order update, which increases the jeopardy-duration without stopping the timer, and then acknowledge/deactivates the old to allow the new jeopardy notification, i.e. the jeopardy management continues until the order reaches a "to" state. This option is only for an order jeopardy definition using an order data field for jeopardy-duration, otherwise an order update has nothing to do with increasing the jeopardy-duration.

In some embodiments, the APIs for stopping timer, snoozing and acknowledging the old to allow the new jeopardy notification are available to the jeopardy notification plugin via an object/context such as OrderJeopardyContext shown in FIGS. 25 and 26 below.

At 610, the jeopardy notification plugin can do nothing, in which case the timer continues and the jeopardy notification stays "active/old" until the order reaches a "to" state or "closed" state (e.g., "Completed" or "Aborted"). If the order reaches a "to" state or "closed" state, the jeopardy management stops timer, and then acknowledge/deactivates the old to allow the new jeopardy notification, i.e. goes back to the "STOPPED" state.

At 612, the jeopardy notification plugin can transmit the order into a skipped-state without doing anything else, in which case the timer pauses and the jeopardy notification stays "active/old" until the order reaches a "to" state or "closed" state. If the order moves to a following non-skipped state, the jeopardy management resumes the timer and all time spent in the non-skipped state is accumulated into the overall duration of time tracked against the jeopardy condition. If the order reaches a "to" state or "closed" state (e.g., "Completed" or "Aborted"), the jeopardy management stops the timer, and then acknowledge/deactivates the old to allow the new jeopardy notification, i.e. goes back to the "STOPPED" state. However, after transiting the order into a skipped-state and before the order moves to a following non-skipped state, if some other operations are performed, such as permanently extending the jeopardy-duration via an order update without stopping the timer, the timer and notification should be handled accordingly, such as acknowledge/deactivating the old to allow the new jeopardy notification.

In some embodiments, an application programming interface ("API") such as, for example, the API shown in FIG. 26 below, is provided which includes a function postponeTimer (interval/dateTime) for postponing a timer as discussed above at 606. A postponeTimer call can only be made in an order jeopardy notification plugin, which means that the order has been in jeopardy according to the jeopardy-duration setting and the current timer. The valid value for interval can be a positive long integer. If it is not specified or non-positive, an exception can be thrown. The valid value for dateTime can be a valid Java date-time string, otherwise an exception can be thrown. By a postponeTimer call, one can postpone the timer's go-off time to—"<current time>+a given interval" or the given dateTime, so that the order will be in jeopardy by the postpone-end (i.e., "<current time>+a given interval" or the given dateTime) not the order's jeopardy-duration setting. The postponeTimer does not change the order's jeopardy-duration setting. At the same time, in the postponeTimer call, the current jeopardy notification is acknowledge/deactivated to allow the new jeopardy notification.

In such embodiments, an accessory method, getTimerPostponedCount( ) (as shown, for example, in FIG. 26 below) is also provided for the plugin to retrieve the number of postponements that have been done on the timer. The postponeTimer method automatically increases the number for the timer.

In some embodiments, the order-level jeopardy functionality is also enhanced with an absolute date-time jeopardy threshold option (based on an order data field). An absolute date-time jeopardy threshold sets the date-time when an order should reach the to-state before being in jeopardy. The threshold of an order jeopardy definition that has empty "from" state is viewed as (order data field based) absolute date-time typed threshold. When an order jeopardy is based on an absolute date-time, it implies that the order should reach the "to" state(s) by the given date-time since the order's creation. In this case the "from" state is shown empty. However, it is implied that the from-state is "NotStarted." Therefore, the timer logic described above for FIGS. 5 and 6 applies to the absolute date-time based jeopardy too, even though the jeopardy threshold calculation is different than the duration based case.

In addition, in some embodiments, there is a special case where the "to" state is "NotStarted." In such embodiments, this case can be viewed as: "the order should be created by the given date-time." Therefore, such jeopardy should never happen because: if the order is created before the given time, it means that the "to" state is reached before the jeopardy threshold; otherwise, the order is created after the given date-time, the system does not raise jeopardy notification retroactively. Therefore, in such embodiments, when an order jeopardy is absolute date-time based, "NotStarted" should never be a choice for the "to" state at design time. To safe-guard, some of such embodiments can guarantee during the order creation, the order jeopardy timer should behave for the "from" state and then the "to" state at the same time for such a case.

The order data field for the absolute date-time can be date or preferably datetime typed. If it is date-typed, like any OSM date-typed order data, it is treated as zero hour/minute/second of the date in the server time. However, if it is datetime-typed, it should contain a time zone in the value; otherwise it is treated as the server time. In some embodiments, the "default" can be a duration value, even for an absolute date-time based threshold. In this case, for an absolute date-time based threshold, the threshold is calculated as "the timer start time+the "default" value".

FIG. 7 illustrates the impact of a jeopardy duration change by order update and/or revision, in accordance with an embodiment. At runtime, if the order data value for the jeopardy "duration"/"datetime" is not provided, the corresponding default value is used. In this case, if the default value (always specified) is zero, the associated jeopardy is ignored for the order. However, if the order data value for the jeopardy "duration"/"datetime" is provided but non-positive, the associated jeopardy is ignored for the order regardless of the default value.

In some embodiments, a jeopardy threshold value change is possible in the case where the jeopardy threshold is set by referencing an external field, such as, for example, an order data field. For example, when an order's multiple order jeopardy definitions are configured to use the same order data field for the jeopardy thresholds, the order data field value applies to every jeopardy condition of the order.

Table 700 shown the possible results of a runtime jeopardy "duration" value change by an order update and/or revision. In some embodiments, a jeopardy threshold "offset" is applied after the jeopardy threshold rules discussed above are applied. If, after applying the "offset", the result is non-positive, the order jeopardy is also ignored.

In some embodiments, system 10 includes a jeopardy scheduler that polls for in-jeopardy orders. In some embodiments, the jeopardy scheduler can poll for in-jeopardy orders as described in FIGS. 28 and/or 29.

In some embodiments the jeopardy scheduler can poll for in-jeopardy orders in batches at specified intervals. For example, the scheduler can, at a first interval, poll for in-jeopardy orders for batch processing. If the number of orders exceeds a max batch size, the scheduler can execute the batch and reschedule a new poll earlier than when the next poll would occur based on the first interval value to process the orders over the batch size. In some such embodiments, jeopardy scheduler settings can be configured as follows:

- Order_Jeopardy_Minimum_Interval (the minimal interval by which the order jeopardy management polls for in-jeopardy orders);
- Order_Jeopardy_Batch_Size (the maximum number of order jeopardies that are dispatched for evaluation/handling at a time);
- Order_Jeopardy_Reschedule_Difference (the minimal interval, earlier than the next poll's start time, by which the next order jeopardy poll should be rescheduled to an earlier time. The value of configuration should not be smaller than the value of Order_Jeopardy_Minimum_Interval).

Figure 8:
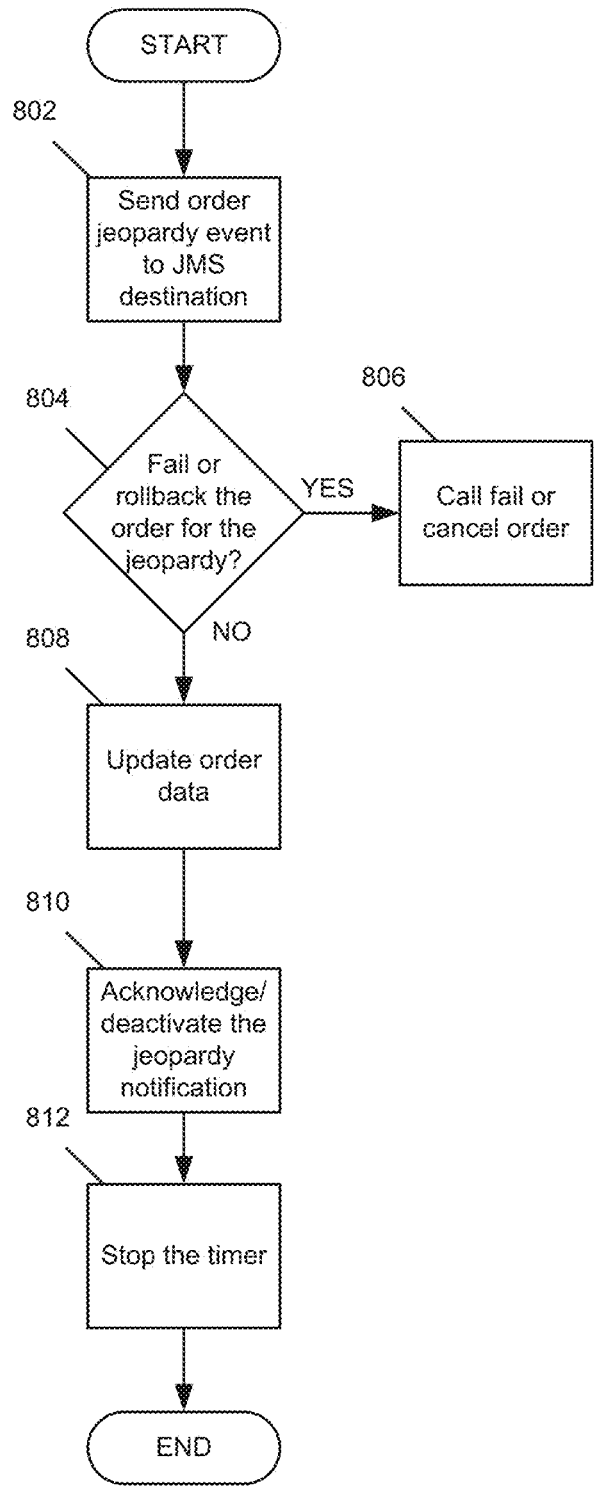
FIG. 8 illustrates a flow diagram of the functionality of a sample order jeopardy timeout plugin, in accordance with an embodiment of the invention.

FIG. 8 illustrates a flow diagram of the functionality of a sample order jeopardy timeout plugin, in accordance with an embodiment. The sample order jeopardy timeout plugin can be configured via parameters such as:

- FailOrderIfInJeopardy (<boolean>);
- GracePeriod (<duration>); and
- RollbackIfFail (MnemonicPath: <mnemonic path of a boolean typed order data field>; Default: <boolean>).

In some embodiments, the values for these parameters can be user-specified and the user-specified values can be passed into an order jeopardy plugin using XQuery and/or Xslt. In some embodiments, an API is provided for plugins such as the sample order jeopardy timeout plugin to update the order status. For example, an API including an "UpdateOrderStatus" function can be provided for plugins to update the order status which returns a <boolean> and accepts the following arguments:

- MnemonicPath (<mnemonic path of the order-level data field>, which cannot be null/empty); and
- Status (<a literal value>).

The flow begins and proceeds to 802. At 802, the sample order jeopardy plugin sends an Order Jeopardy Event out to a Java Message Service ("JMS") destination. An object NotificationView configured for the plugin should contain all the order data that the plugin requires. The given OutBoundEvent contains the rest of the information required to create the Order Jeopardy Event.

At 804, the sample order jeopardy plugin checks whether to fail or rollback the order for the jeopardy, based on the given FailOrderIfInJeopardy.

At 806, the sample order jeopardy plugin calls fail or cancel order with the given GracePeriod, according to the result of the check at 804.

At 808, the sample order jeopardy plugin updates the order data deriving the Order-Timeout fulfillment state.

At 810, the sample order jeopardy plugin acknowledge/deactivates the jeopardy notification for the order to ensure a jeopardy notification will happen to the next/new timeout of the order.

At 812, the sample order jeopardy plugin stops the timer. In some embodiments, the timer is stopped when the plugin acknowledge/deactivates the jeopardy notification at 810.

FIGS. 9 and 10 illustrate an order jeopardy configuration including an order jeopardy timeout plugin and an order jeopardy warning plugin, in accordance with an embodiment. Order Jeopardy Conditions (SLAs) can be configured in XML format as shown in XML listing 900 and XML listing 1000 which include an "orderJeopardy" model, an "orderJeopardyByOperational" model, and an "extendedOrder" model. The "orderJeopardy" model specifies an Order Jeopardy Condition at the order level and the "orderJeopardyByOperational" model specifies an Order Jeopardy Condition at the system level. Model "extendedOrder" registers an order jeopardy timeout plugin, "SampleOrderTimeout," and an order jeopardy warning plugin, "SampleOrderWarning," plugin with the order "SampleOrder."

A jeopardy warning plugin can be specified and configured with a duration shorter than the corresponding timeout plugin to allow the system and/or a user to react, provide notification, or take other action prior to the actual jeopardy timeout time which may, for example, prevent the timeout from occurring.

Figure 11:
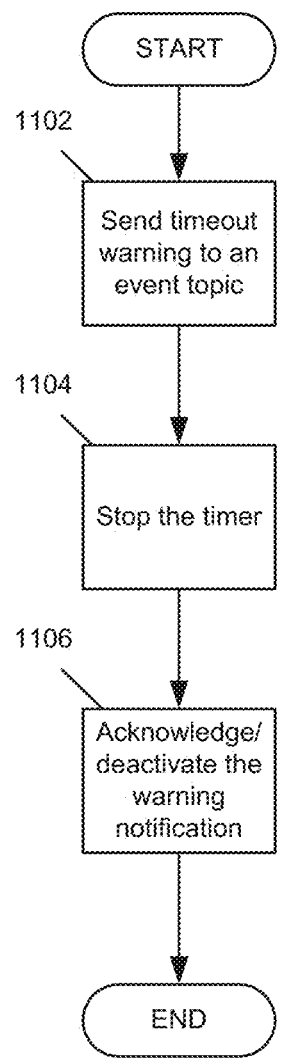
FIG. 11 illustrates a flow diagram of the functionality of a sample order jeopardy warning plugin, in accordance with an embodiment of the invention.

FIG. 11 illustrates a flow diagram of the functionality of a sample order jeopardy warning plugin, in accordance with an embodiment.

Flow begins and proceeds to 1102. At 1102, the sample order jeopardy warning plugin sends a notification such as a JMS event to a JMS Event Topic (so that, e.g., an interested party can take some intervening action beforehand to prevent the timeout from happening). Additionally or alternatively, an email, text message, or other type of notification can be sent to the interested party.

At 1104, the sample order jeopardy warning plugin stops the timer.

At 1106, the sample order jeopardy warning plugin acknowledges/deactivates the jeopardy notification for the order to ensure the jeopardy notification will happen to the next/new timeout of the order.

FIGS. 12-18 illustrate graphical user interfaces for policy-based order jeopardy management, according to one or more embodiments of the invention.

Figure 12:
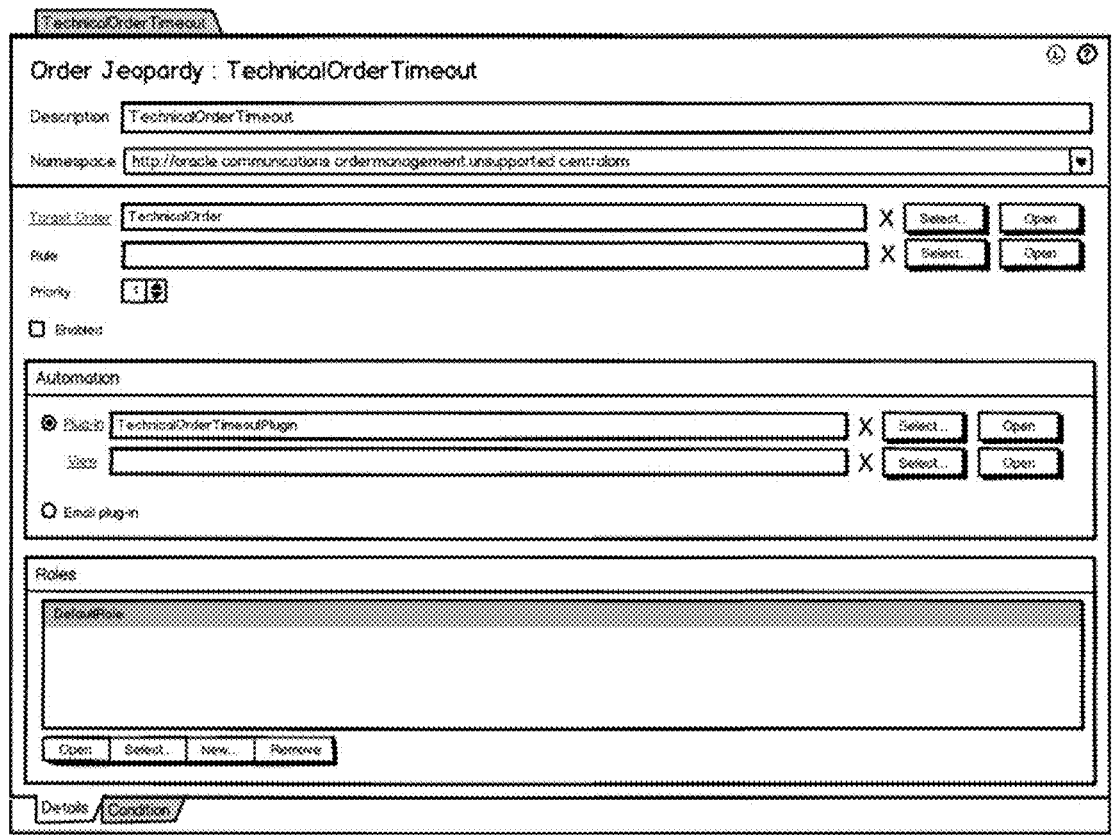
FIGS. 12-18 illustrate graphical user interfaces for policy-based order jeopardy management, according to one or more embodiments of the invention.

FIG. 12 illustrates a graphical user interface for defining an Order Jeopardy Entity, in accordance with an embodiment. The graphical user interface of FIG. 12 enables design time configuration of a jeopardy policy against a particular order type. This graphical user interface enables configuration of the jeopardy handler (automation plugin) to be executed when the jeopardy event occurs.

Figure 13:
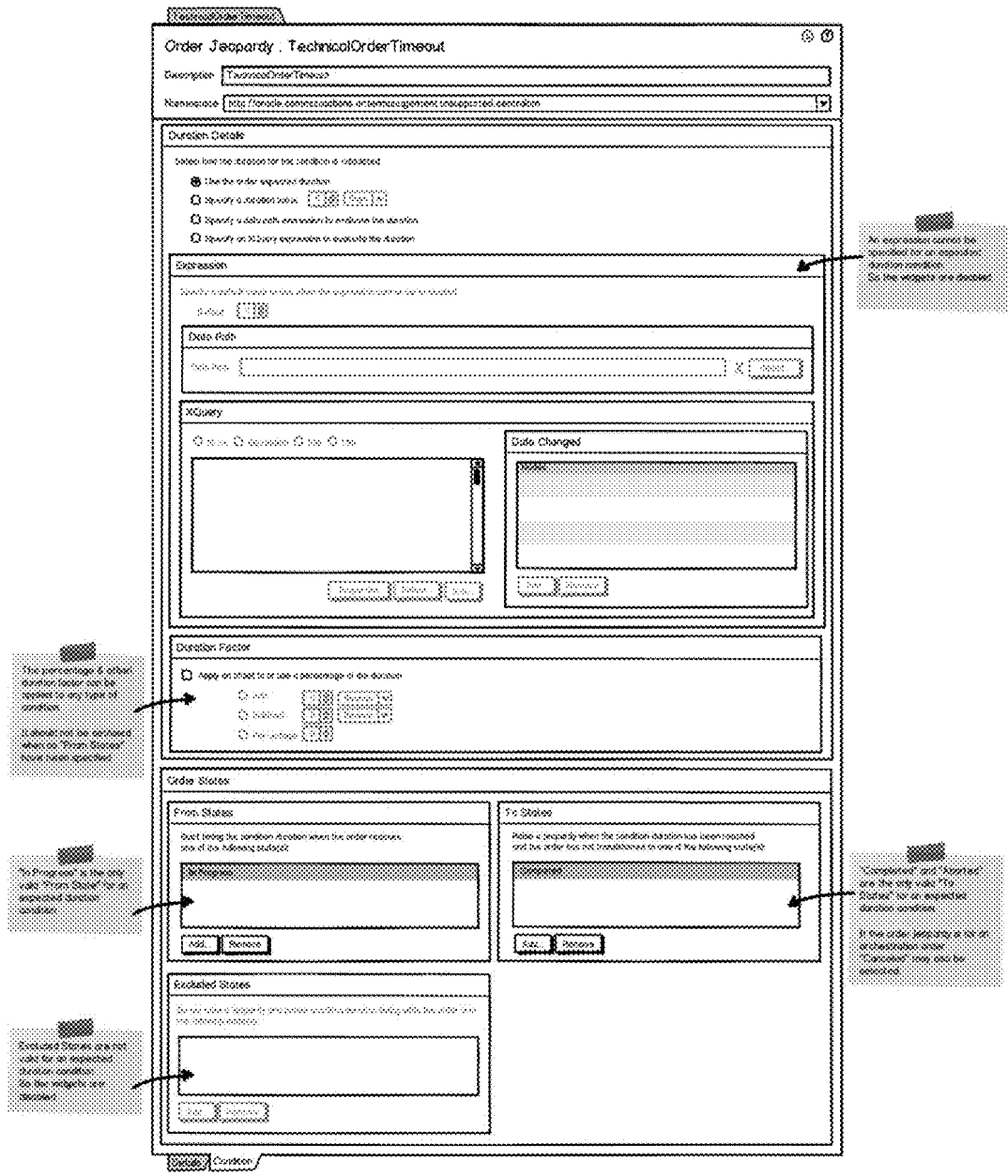
Figure 14:
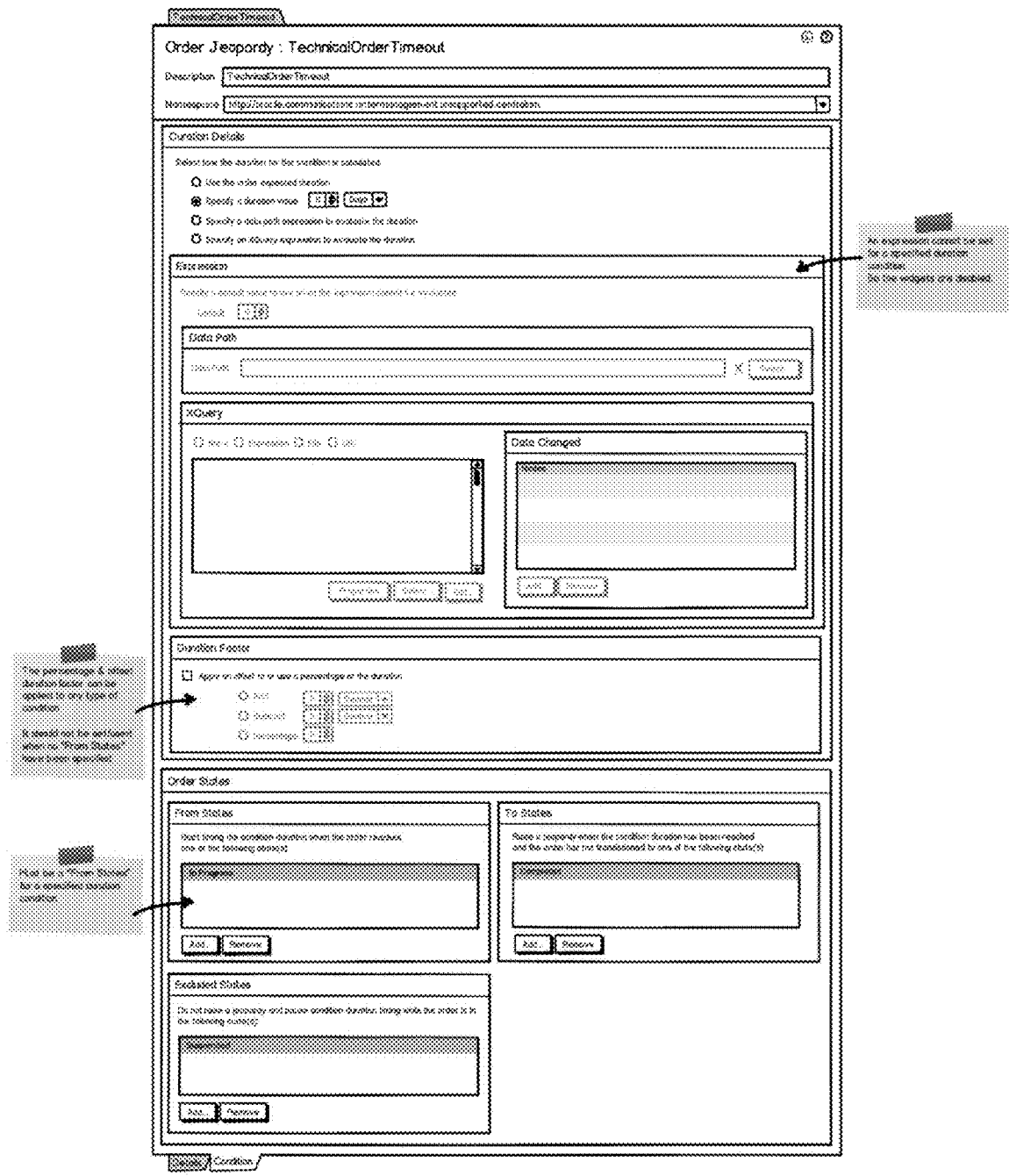
Figure 15:
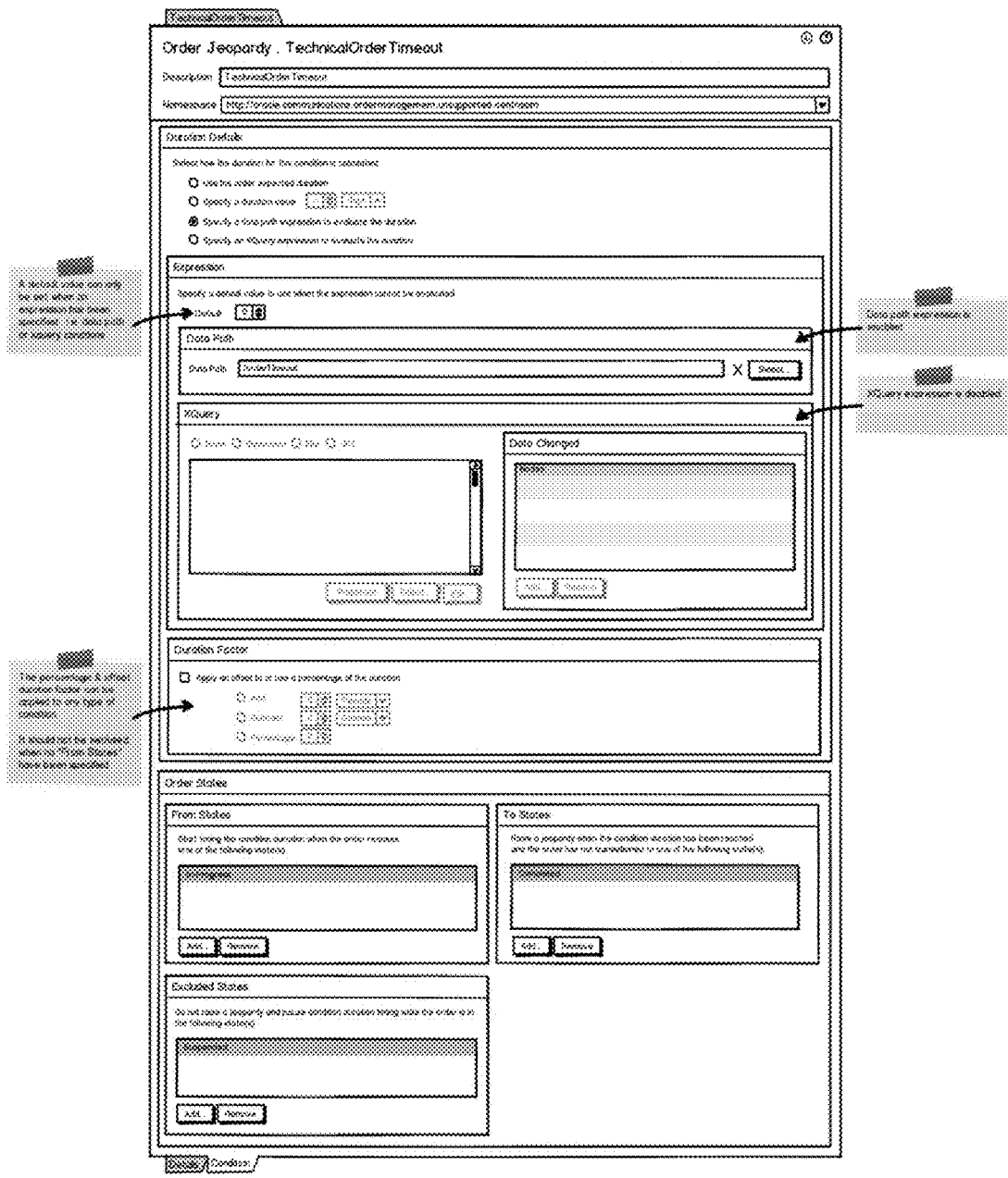
Figure 16:
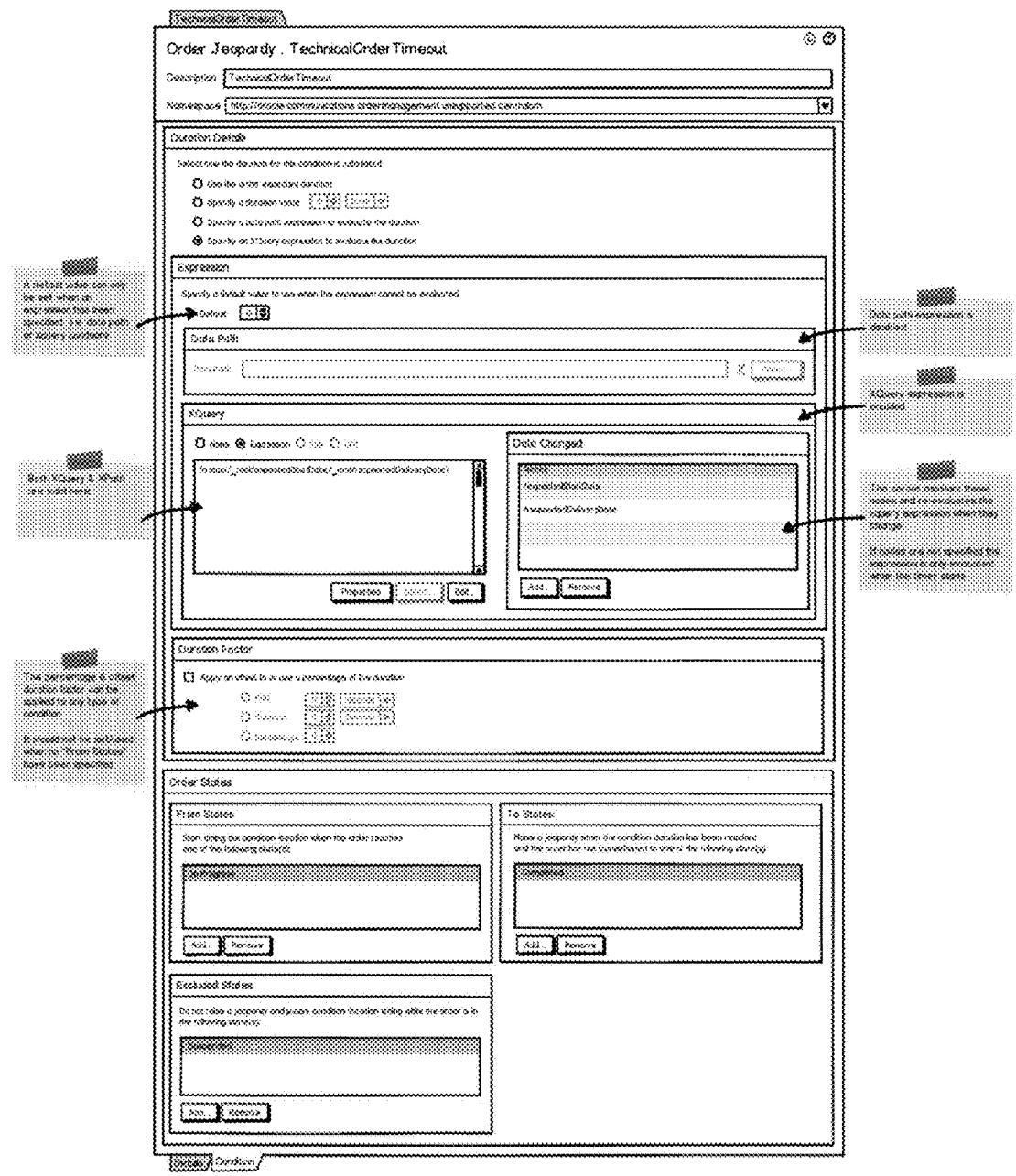
Figure 17:
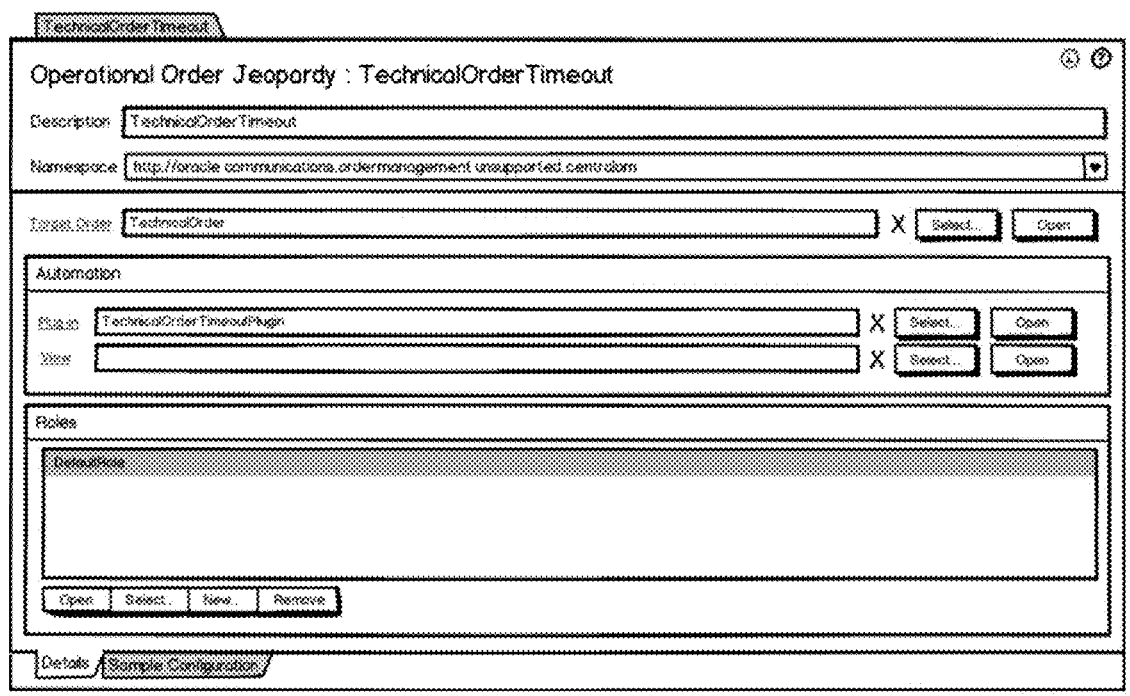
Figure 18:
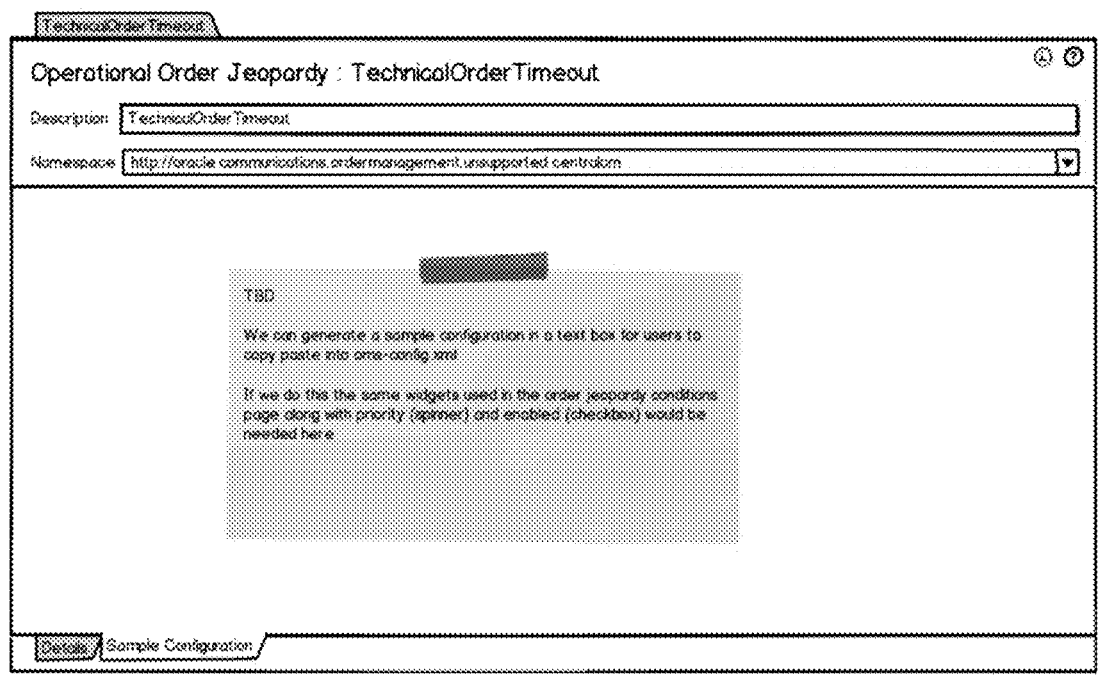

FIGS. 13-16 illustrate graphical user interfaces enabling design time configuration of a jeopardy policy's details (e.g., conditions for when the jeopardy timer starts, stops and is skipped (excluded states), and the duration of time before the jeopardy event should be triggered). FIG. 13 illustrates a graphical user interface for defining an order jeopardy policy based on the order expected duration, in accordance with an embodiment. FIG. 14 illustrates a graphical user interface for defining an order jeopardy policy based on a specified duration value, in accordance with an embodiment. FIG. 15 illustrates a graphical user interface for defining an order jeopardy policy based on a specified data path expression to evaluate the duration, in accordance with an embodiment. FIG. 16 illustrates a graphical user interface for defining an order jeopardy policy based on a specified XQuery expression to evaluate the duration, in accordance with an embodiment. FIG. 17 illustrates a graphical user interface for defining an Operational Order Jeopardy Entity, in accordance with an embodiment. FIG. 18 illustrates a graphical user interface for displaying a sample configuration based on the specified operational order jeopardy policy, in accordance with an embodiment.

FIGS. 19A-26 illustrate various metadata models and corresponding XML schemas of order jeopardy management objects, according to an embodiment of the invention.

Figure 19A:
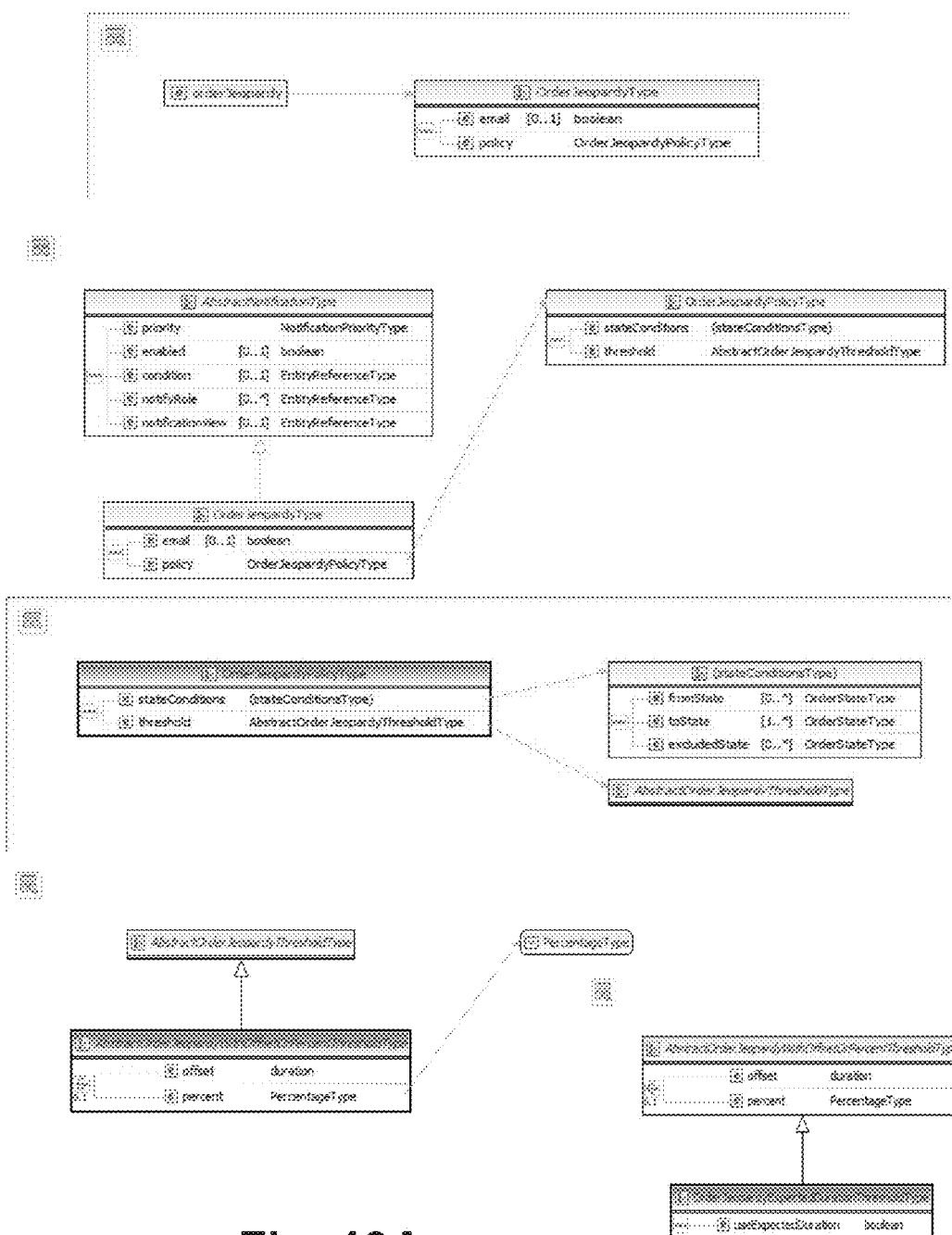
FIGS. 19A and 19B illustrate a metadata model of an Order Jeopardy Notification object, according to an embodiment of the invention.
Figure 19B:
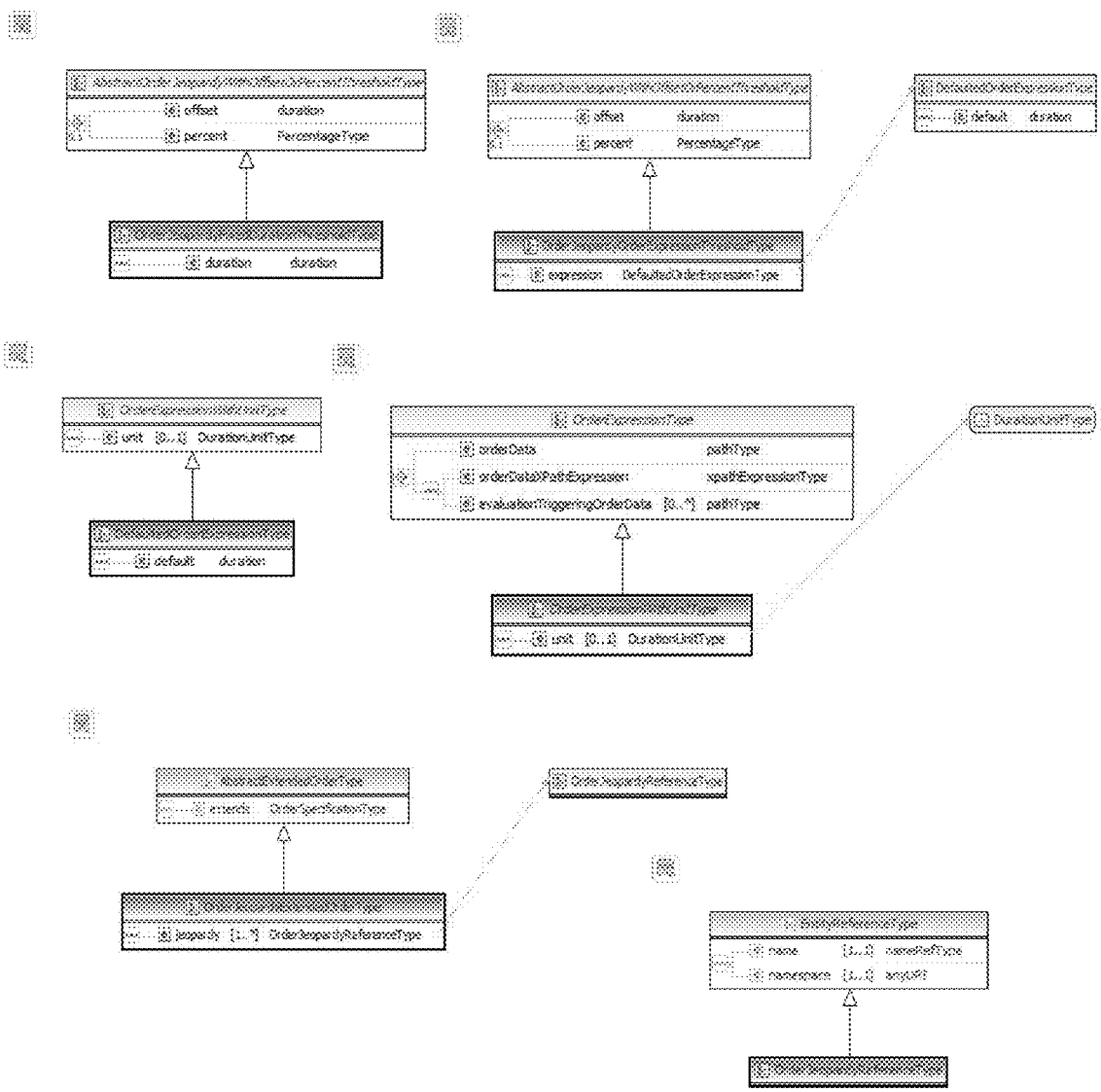

FIGS. 19A and 19B illustrate a metadata model of an Order Jeopardy Notification object, according to an embodiment of the invention. The Order Jeopardy Notification object is of type "OrderJeopardyType" (or Order Jeopardy Type) shown in the metadata model. Order Jeopardy Type represents an order jeopardy definition for an order from entering a "fromState" to reaching a "toState." As illustrated in FIG. 19A, Order Jeopardy Type extends (or inherits from) AbstractNotificationType and includes a "policy" object of type "OrderJeopardyPolicyType" (or Order Jeopardy Policy Type). Order Jeopardy Policy Type includes a "stateConditions" object of type "stateConditionsType" (which includes zero or more "fromState" objects, one or more "fromState" objects, and zero or more "excludedState" objects) and a "threshold" object of type "AbstractOrderJeopardyThresholdType" (or Abstract Order Jeopardy Threshold Type). As further illustrated in FIG. 19A, type "AbstractJeopardyWithOffsetOrPercentageThresholdType" (or Abstract Jeopardy With Offset Or Percentage Threshold Type) extends Abstract Order Jeopardy Threshold Type, with type "OrderJeopardyExpectedDurationThresholdType" extending Abstract Jeopardy With Offset Or Percentage Threshold Type. FIG. 19B illustrates additional types "OrderJeopardyFixedDurationThresholdType" and "OrderJeopardyOrderExpressionThresholdType," each of which extends Abstract Jeopardy With Offset Or Percentage Threshold Type shown in FIG. 19A.

Figure 20:
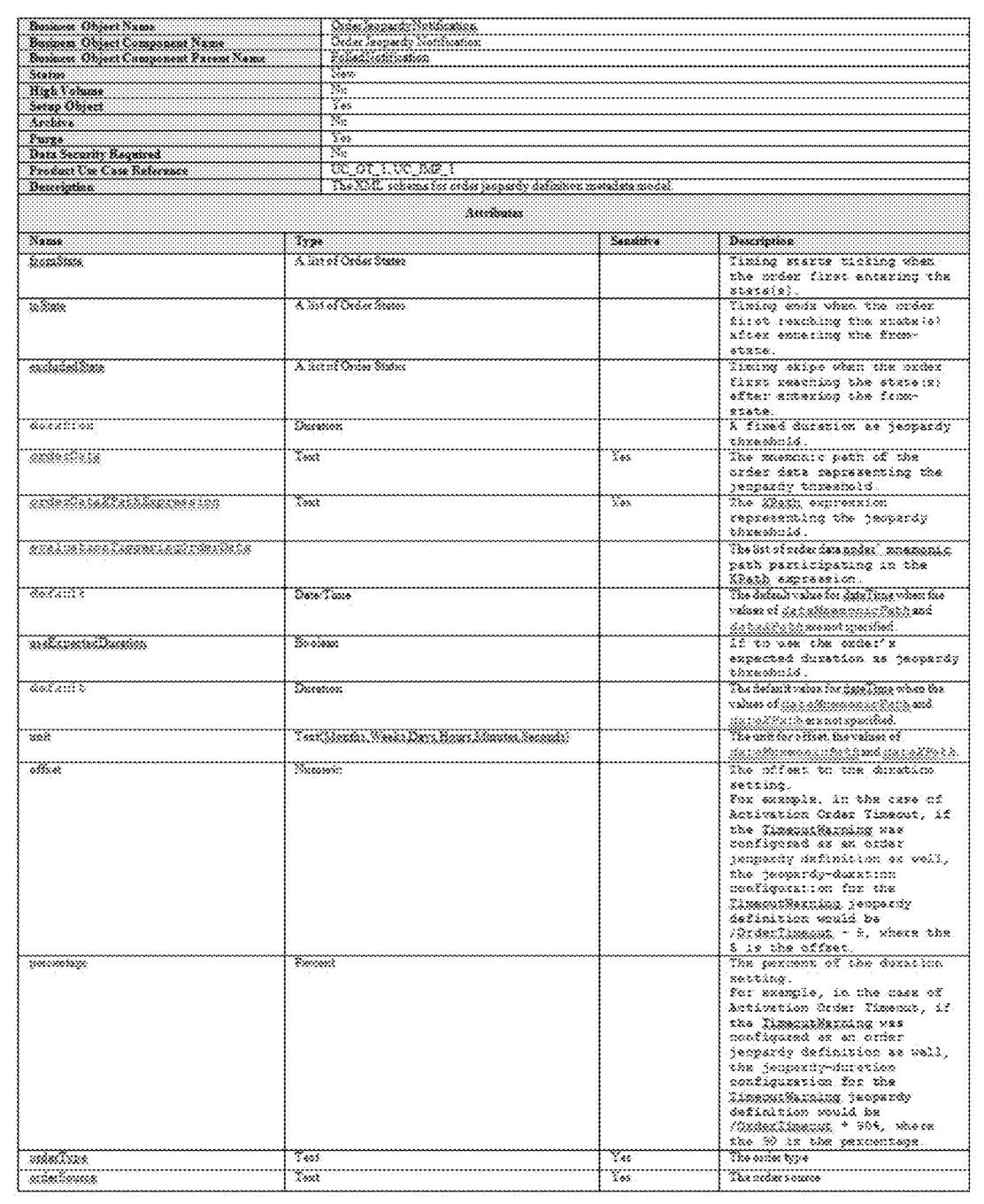

FIG. 20 illustrates an XML schema of an Order Jeopardy Type, according to an embodiment of the invention. The XML schema can be used to define an Order Jeopardy Type object including an Order Jeopardy Condition (SLA) in XML format as shown, for example, in FIG. 9.

Figure 21:
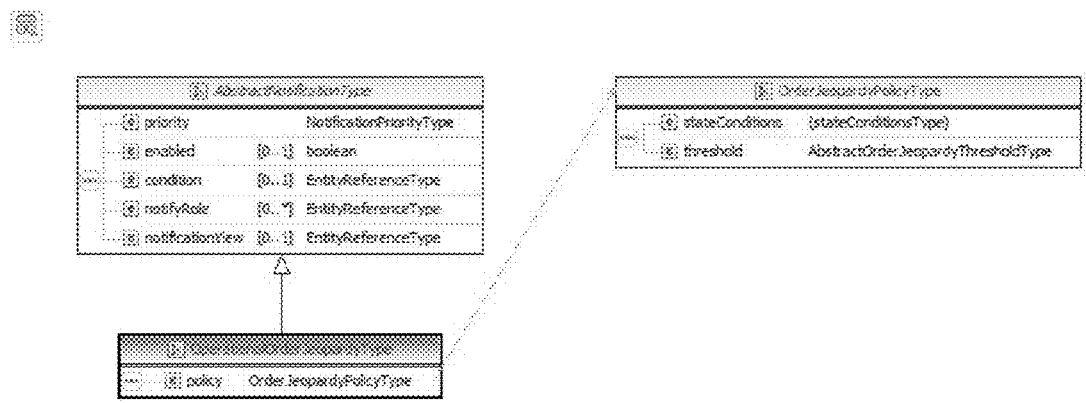
FIG. 21 illustrates a metadata model of an Operational Order Jeopardy Notification object, according to an embodiment of the invention.

FIG. 21 illustrates a metadata model of an Operational Order Jeopardy Notification object, according to an embodiment of the invention. The Operational Order Jeopardy Notification object is of type "OperationalOrderJeopardyType" (or Operational Order Jeopardy Type) shown in the metadata model. Operational Order Jeopardy Type represents a jeopardy configuration in the system configuration for an order from entering a "fromState" to reaching a "toState." Similar to Order Jeopardy Type shown in FIGS. 19A and 19B, Operational Order Jeopardy Type extends Abstract Notification Type and includes a "policy" object of type Order Jeopardy Policy Type. Abstract Notification Type and Order Jeopardy Policy Type are illustrated in FIGS. 19A and 19B and described above.

FIG. 22 illustrates an XML schema of an Operational Order Jeopardy Type, according to an embodiment of the invention. The XML schema can be used to define an Operational Order Jeopardy Type object including an Order Jeopardy Condition (SLA) in XML format as shown, for example, in FIG. 9.

Figure 23:
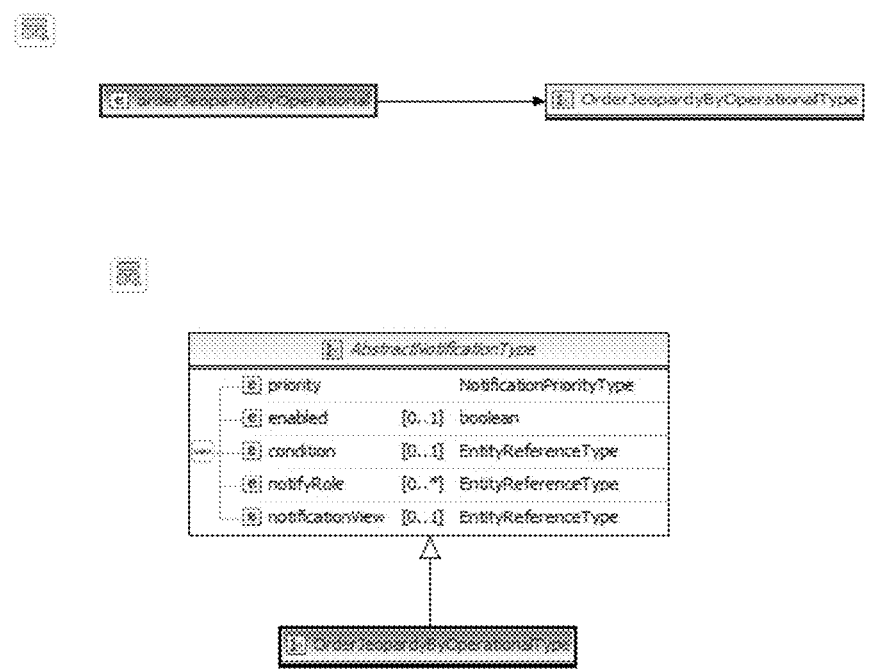
FIG. 23 illustrates a metadata model of an Order Jeopardy By Operational Notification object, according to an embodiment of the invention.

FIG. 23 illustrates a metadata model of an Order Jeopardy By Operational Notification object, according to an embodiment of the invention. The Order Jeopardy By Operational Notification object is of type "OrderJeopardyByOperationalType" (or Order Jeopardy By Operational Type) shown in the metadata model. Order Jeopardy By Operational Type represents an order jeopardy notification based on a configuration in the system configuration.

FIG. 24 illustrates an XML schema of an Order Jeopardy By Operational Type, according to an embodiment of the invention. The XML schema can be used to define an Order Jeopardy By Operational Type object including an Order Jeopardy Condition (SLA) in XML format as shown, for example, in FIG. 9.

Figure 25:
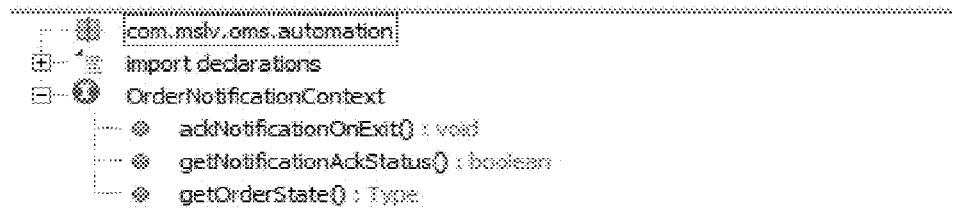
FIG. 25 illustrates a metadata model of an Order Notification Context, according to an embodiment of the invention.

FIG. 25 illustrates a metadata model of an Order Notification Context, according to an embodiment of the invention. The Order Notification Context is accessible to an order jeopardy plugin such as, for example, the plugins discussed above with respect to FIGS. 2, 6, and 8-10.

FIG. 26 illustrates an order jeopardy plugin interface, according to an embodiment of the invention. The jeopardy plugin interface defines the methods for order jeopardy plugins to use and extends the Order Notification Context shown in FIG. 25. Upon receiving a jeopardy notification, the jeopardy plugin interface is automatically made available to an order jeopardy plugin such as, for example, the plugins discussed above with respect to FIGS. 2, 6, and 8-10.

Figure 27:
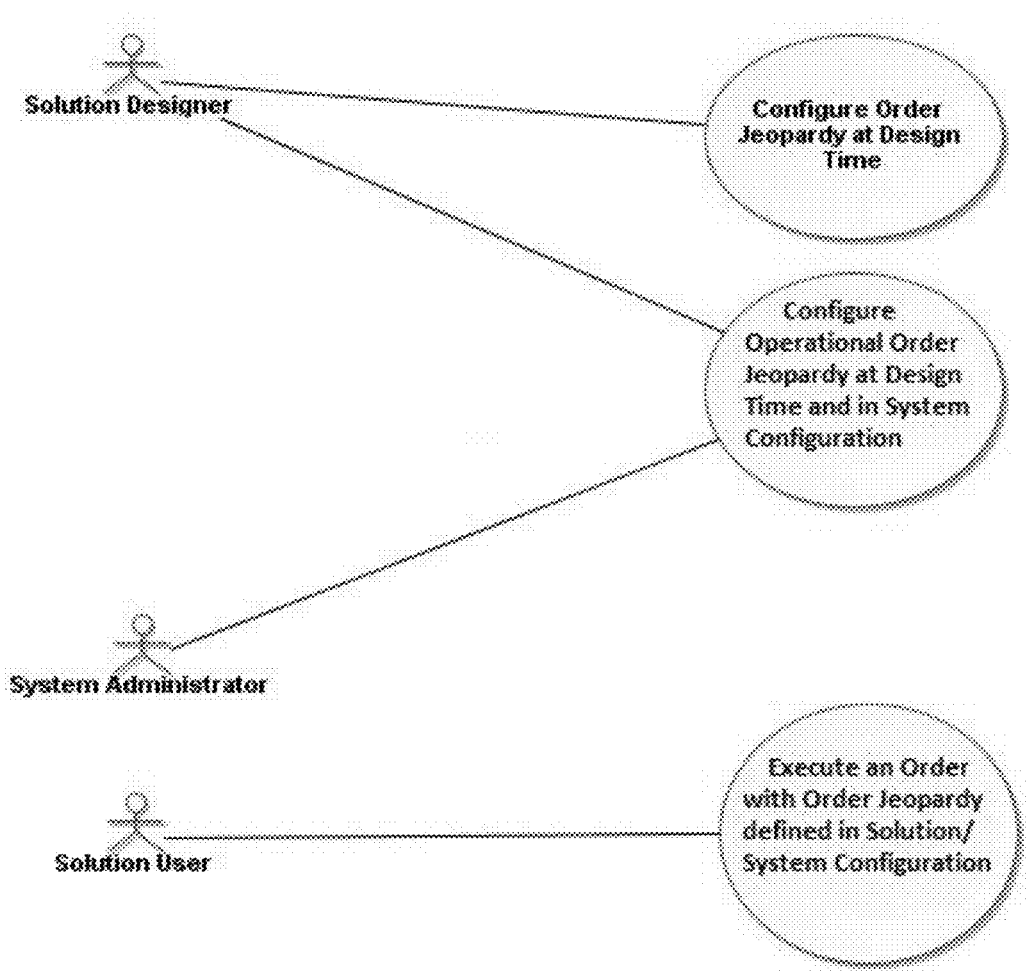
FIG. 27 illustrates order jeopardy user roles, according to an embodiment of the invention.

FIG. 27 illustrates order jeopardy user roles, according to an embodiment of the invention. In some embodiments, the order jeopardy user roles include a solution designer, a system administrator, and a solution user. The solution designer can configure order jeopardy settings, and configure an operational order jeopardy plugin at design time via, for example Design Studio in FIG. 2 described above. The system administrator can also configure the rest of operational order jeopardy settings (e.g., settings which are not configured at design time such as, for example, Order Jeopardy Conditions) by, for example, manually editing the system configuration files and/or copying the sample configuration generated by Design Studio in FIG. 2. The solution user can execute an order with order jeopardy defined in the solution and/or the system configuration files.

Figure 28:
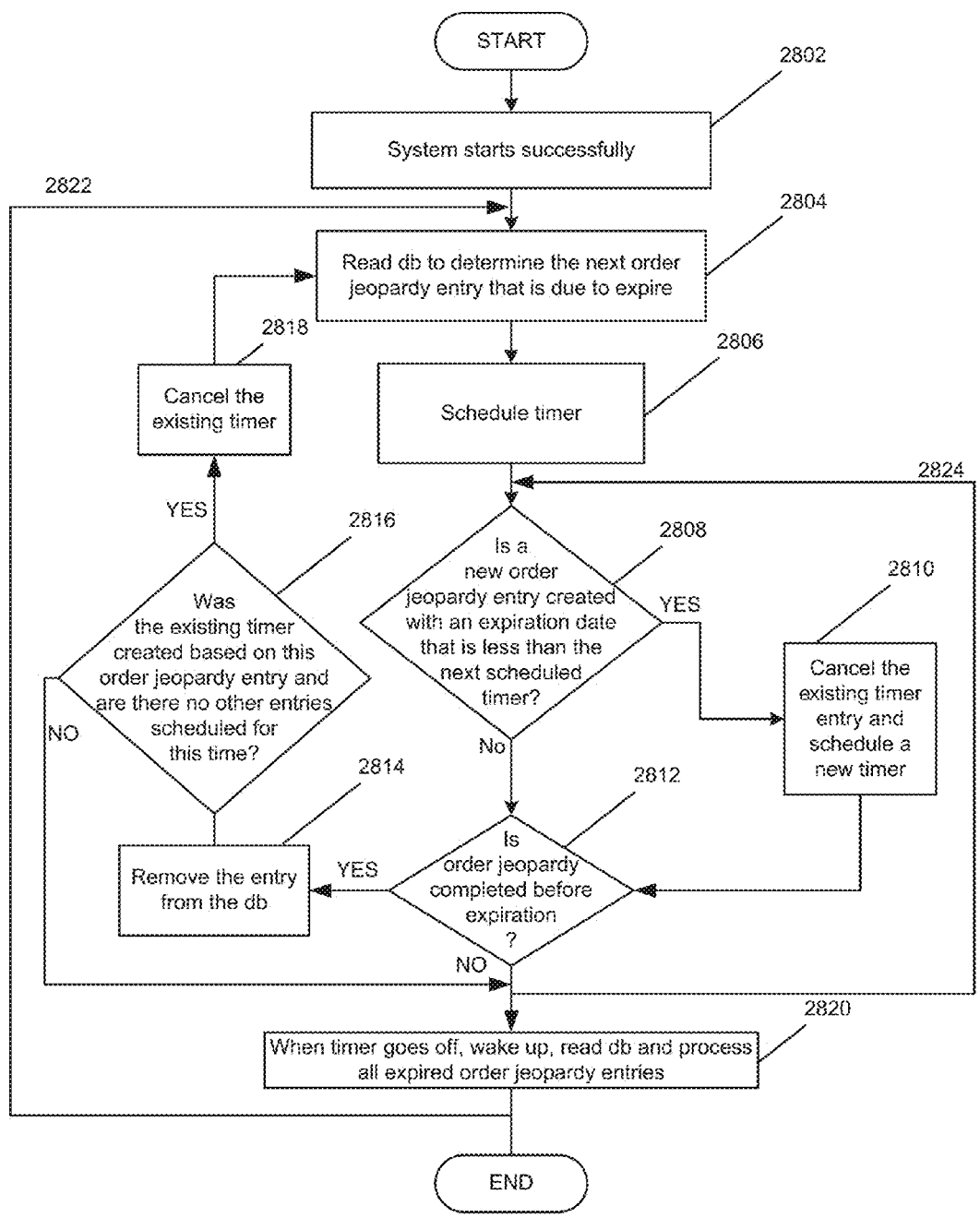
FIG. 28 illustrates a flow diagram of the functionality of a timer method for jeopardy management, in accordance with an embodiment of the invention.
Figure 29:
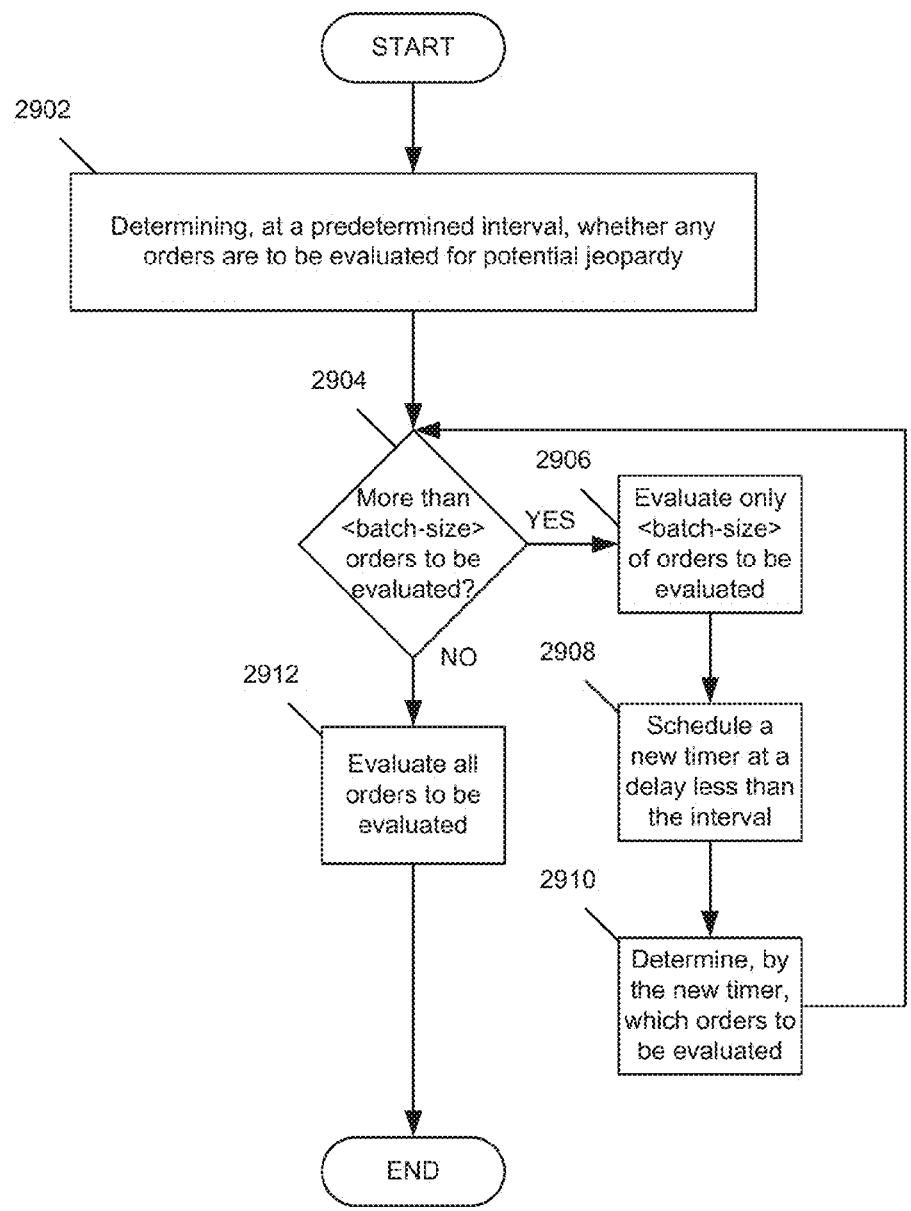
FIG. 29 illustrates a flow diagram of the functionality of a timer method for jeopardy management, in accordance with an embodiment of the invention.

FIGS. 28 and 29 illustrate flow diagrams of the functionality of timer methods for jeopardy management. Such timer methods improve the functioning of system 10 to more efficiently schedule and handle timers for evaluating/determining potential orders in jeopardy. By permitting jeopardy management policies to be defined more flexibly using, for example, Order Jeopardy Conditions, the number of possible jeopardy conditions is significantly increased in comparison to systems which support less flexible jeopardy definitions. The timer methods improve the functioning of system 10 by, for example, reducing the number of timers and corresponding interrupts needed to processes the increased number of possible jeopardy conditions created by the more flexible jeopardy management policies enabled by system 10.

FIG. 28 illustrates a flow diagram of the functionality of a timer method for jeopardy management, in accordance with an embodiment.

The flow begins and proceeds to 2802. At 2802, module 18 the system starts successfully.

At 2804, module 18 reads from the database to determine the next order jeopardy entry that is due to expire.

At 2806, module 18 schedules a timer.

At 2808, module 18 determines whether a new order jeopardy has been created with an expiration date that is less than the next scheduled timer and if so, continues to 2810, otherwise module 18 continues to 2812.

At 2810, module 18 cancels the existing timer scheduled at 2806 and schedules a new timer for the new order jeopardy found at 2808.

At 2812, module 18 determines whether order jeopardy has completed before the jeopardy expiration date (i.e., the jeopardy time threshold) and, if so, continues to 2814, otherwise module 18 continues to 2820.

At 2814, module 18 removed the order jeopardy entry which was determined to be completed at 2812.

At 2816, module 18 determines whether the existing timer was created based on this order jeopardy entry and no other entries are scheduled for this timer and, if so, continues to 2818.

At 2818, module 18 cancels the existing timer.

At 2820, module 18, when the timer goes off, wakes up, reads the database, and processes all expired order jeopardy entries.

It will be appreciated that the flow can be repeated in whole or in part, examples of which are provided as lines 2822 and 2824.

In some embodiments, module 18 optimizes the method described above by grouping order jeopardy entries that have an expiration date within a certain range of each other. For example, instead of scheduling the timer to go off at the exact time an entry is due, module 18 schedules the next timer to go off no more than 10 seconds from when the next entry is due. This means that when module 18 determines that the time for the next timer (at 2804 above), module 18 reads the database to determine the maximum expiration date that is within 10 seconds of the next entry to expire, as shown in the following pseudo-sql: select max(expiration_date) from orderjeopardy_entry where expiration_date<10 secs+(select min(expiration_date from om_order_jeopardy_entry where dispatched='n') and dispatched='n'. To prevent missing expired events, module 18 can go through all the expired events and trigger them when, for example, the system restarts.

FIG. 29 illustrates a flow diagram of the functionality of a timer method for jeopardy management, in accordance with an embodiment.

The flow begins and proceeds to 2902. At 2902, module 18 determines, at a predetermined interval, whether any orders are to be evaluated for potential jeopardy.

At 2904, module 18 determines whether the number of orders identified for evaluation at 2902 exceeds a specified batch size. If the number of order exceeds the batch size, then processing continues to 2906, otherwise processing continues to 2012.

At 2906, module 18 evaluates only the batch size number of orders to determine whether those orders are in jeopardy based on their corresponding Order Jeopardy Condition (SLA).

At 2908, module 18 schedules a new timer at a delay less than the interval mentioned at 2902.

At 2910, module 18 determines which orders are to be evaluated for potential jeopardy.

At 2912, module 18 evaluates all orders identified for evaluation to determine whether those orders are in jeopardy based on their corresponding Order Jeopardy Condition (SLA).

Figure 30:
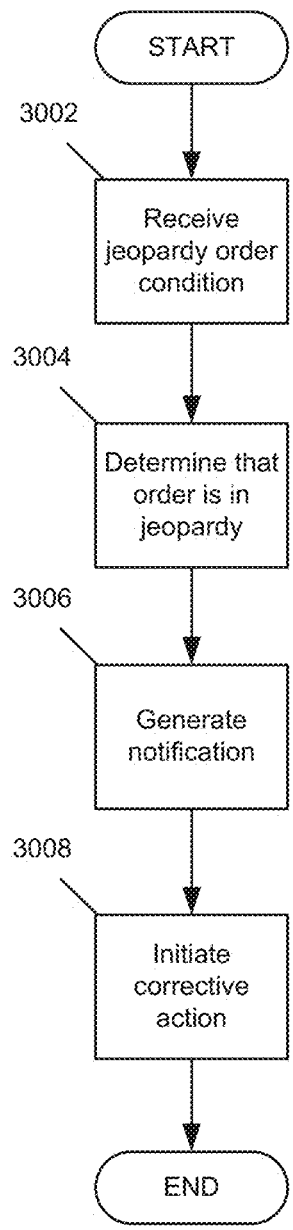
FIG. 30 illustrates a flow diagram of the functionality of jeopardy management, in accordance with an embodiment of the invention.

FIG. 30 illustrates a flow diagram of the functionality of jeopardy management, in accordance with an embodiment.

The flow begins and proceeds to 3002. At 3002, module 18 receives a jeopardy order condition to be applied to an order. The jeopardy order condition can include an order state transition path and a jeopardy time threshold. The order state transition path can include zero or more "from" states and one or more "to" states to define one or more order state transitions.

At 3004, module 18 determines that the order is in jeopardy when the order fails to complete one of the order state transitions within the jeopardy time threshold. For example, module 18 can implement the jeopardy timer described above in FIG. 5 to determine when an order is in jeopardy.

At 3006, module 18 generates, responsive to the determining at 3004, a notification indicating that the order is in jeopardy. For example, the notification can be a jeopardy notification sent to an order jeopardy plugin, as described above in FIGS. 7-12. Additionally or alternatively, the notification can be generated and transmitted to an end-user or another system as, for example, a JMS message, an e-mail, a text message, etc.

At 3008, module 18 initiates corrective action. For example, module 18 can initiate corrective actions to rectify problems so that further jeopardy conditions (e.g., SLA violations) are avoided such as updating the current order, submitting a revision order that revises the current order, cancelling the order, and/or other actions such as those discussed above with respect to FIG. 6.

Figure 31:
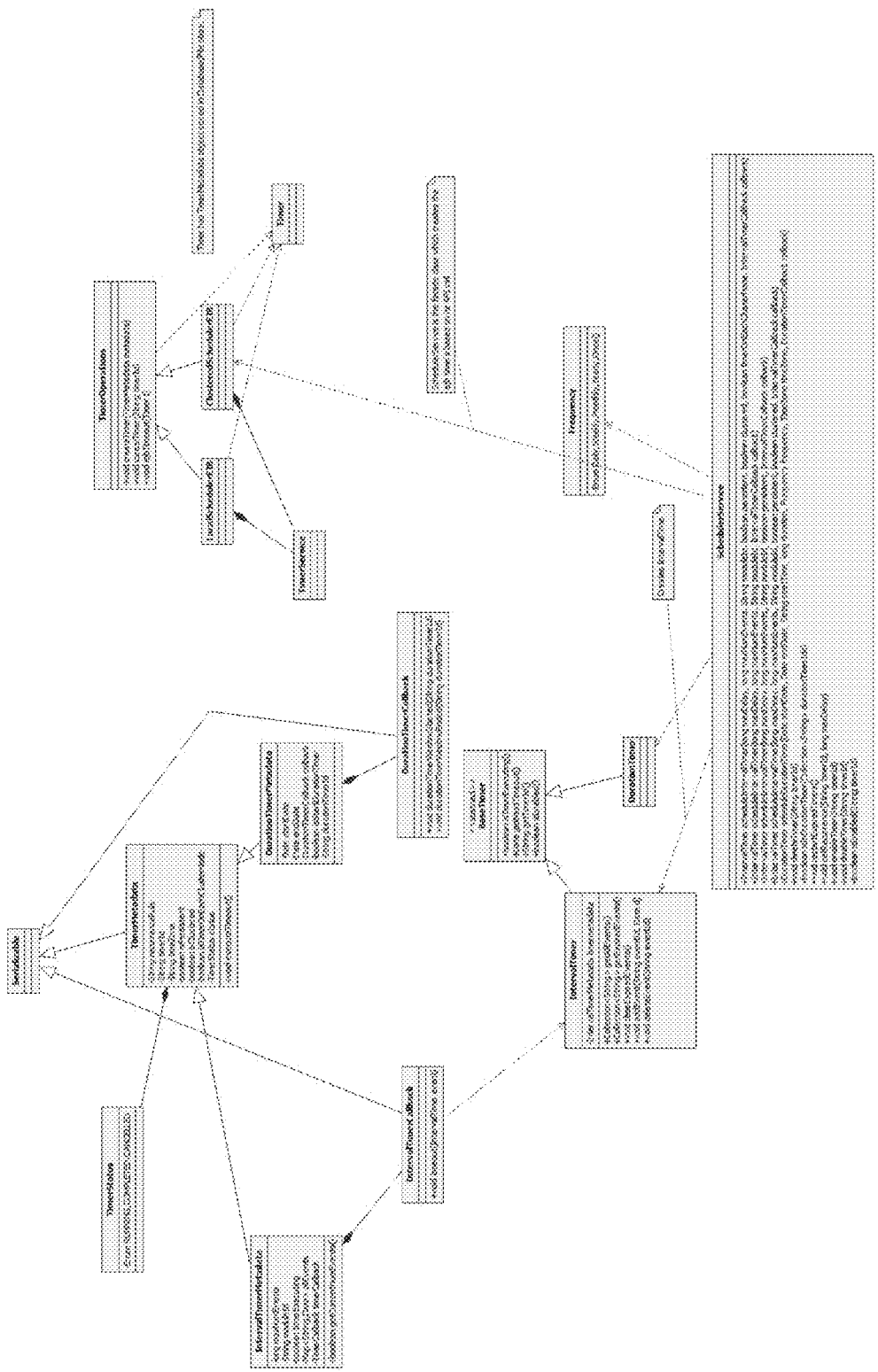
FIG. 31 illustrates a class diagram of the functionality of a timer method for jeopardy management, in accordance with an embodiment.

FIG. 31 illustrates a class diagram of the functionality of a timer method for jeopardy management, in accordance with an embodiment. The timer method for jeopardy management can be implemented according to the Enterprise JavaBeans ("EJB") architecture or application programming interface ("API"). The timer method can provide one or both of the following services: generic scheduler service providing a framework for creating timers; and a duration timer service for creating/managing blackout timers.

In embodiments, the timer method can be distributed across nodes in a cluster and one EJB can be provided for a cluster EJB service and/or another EJB can be provided for a local node service. In some embodiments, timers can be configured to be persistent or non-persistent. The cluster EJB service can provide increased visibility (i.e., timers can be accessible from any node in a cluster) and automatic load balancing and/or failover. The local EJB service can be configured to execute only on the server on which they are created and visible only to the beans on that server.

In some embodiments, the timer method of FIG. 28 can be implemented by the classes shown in the class diagram of FIG. 31 according to the sequence diagrams shown in FIGS. 32-36.

Figure 32:
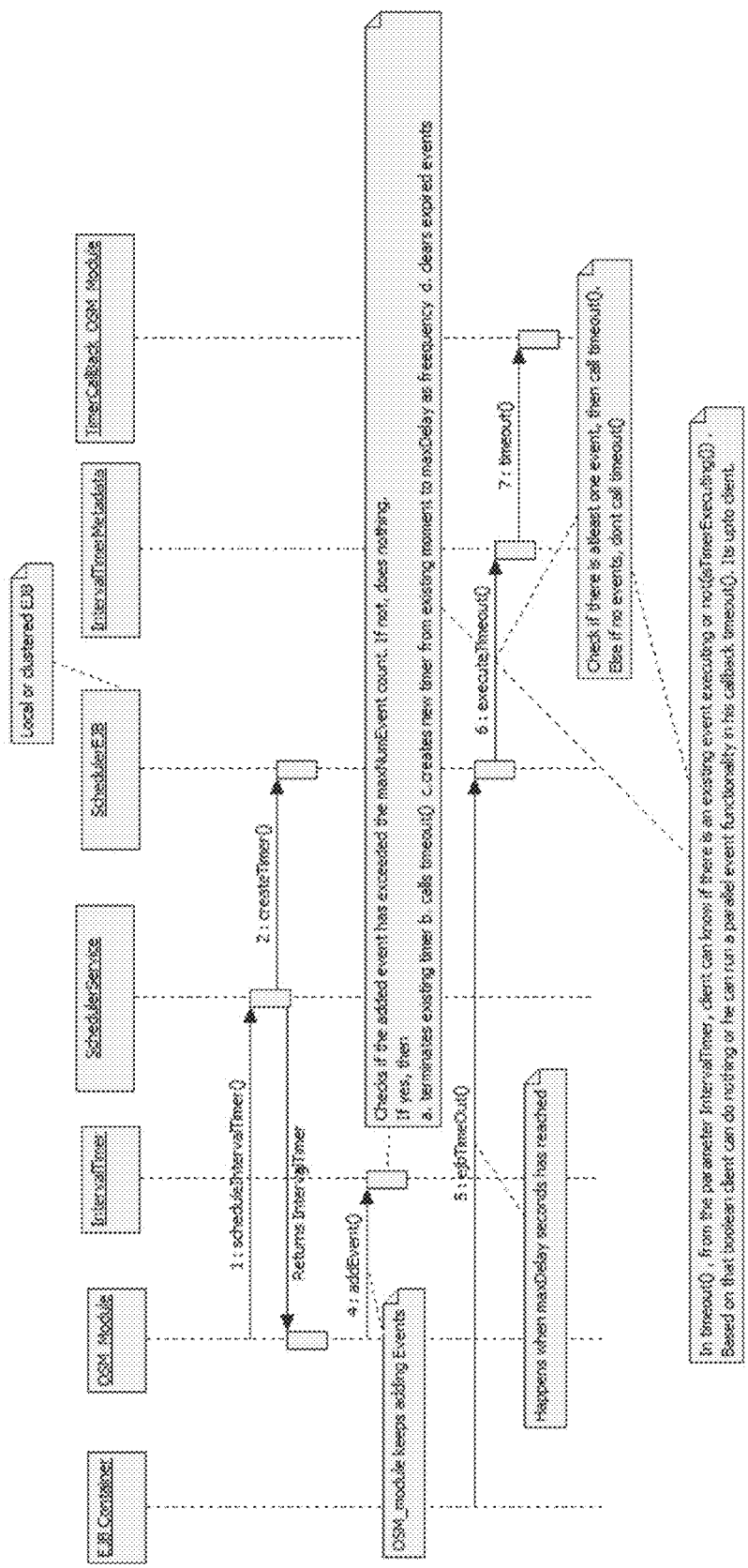
FIG. 32 illustrates a sequence diagram of the functionality of a timer method for scheduling an interval timer on a single node, in accordance with an embodiment.

FIG. 32 illustrates a sequence diagram of the functionality of a timer method for scheduling an interval timer on a single node, in accordance with an embodiment. The sequence diagram includes components "EJB Container," "OSM Module," "IntervalTimer," "SchedulerService," "SchedulerEJB," "IntervalTimerMetaData," and "TimerCallback OSM Module" and illustrates the interactions between these components to schedule an interval timer on a single node. EJB Container can be used to execute an EJB application in an embeddable container. OSM Module is a component/service that is a client of the SchedulerService. OSM Module can perform order jeopardy management as disclosed herein. IntervalTimer is a recurring timer. SchedulerService is an interface to the scheduling services. Clients (e.g., OSM Module) can request, via SchedulerService, callback events on either a recurring (interval) or explicit duration of time. SchedulerEJB is an EJB component that can be persistent. IntervalTimerMetaData is a schedule configuration provided by an OSM Module to the SchedulerService for scheduling one or more IntervalTimers. TimerCallback OSM Module is a callback event on the OSM Module from the SchedulerService to tell the OSM Module that one or more scheduled events have now expired or are expiring.

Figure 33:
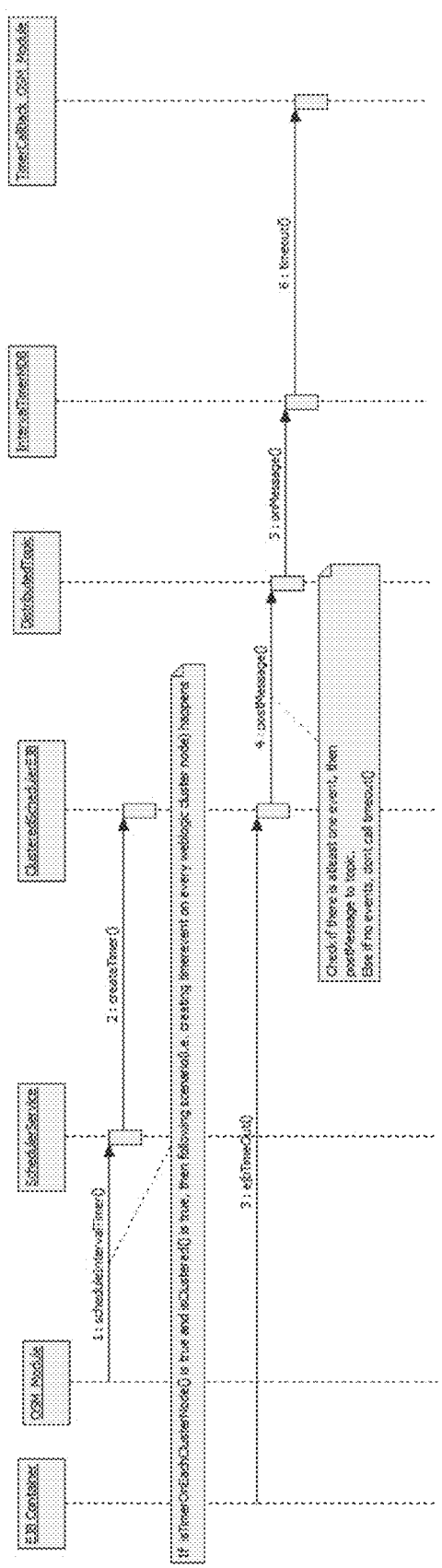
FIG. 33 illustrates a sequence diagram of the functionality of a timer method for scheduling a clustered interval timer, in accordance with an embodiment.

FIG. 33 illustrates a sequence diagram of the functionality of a timer method for scheduling a clustered interval timer, in accordance with an embodiment. The sequence diagram includes components EJB Container, OSM Module, IntervalTimer, SchedulerService, SchedulerEJB, IntervalTimerMetaData, and TimerCallback OSM Module and illustrates the interactions between these components to schedule a clustered interval timer.

Figure 34:
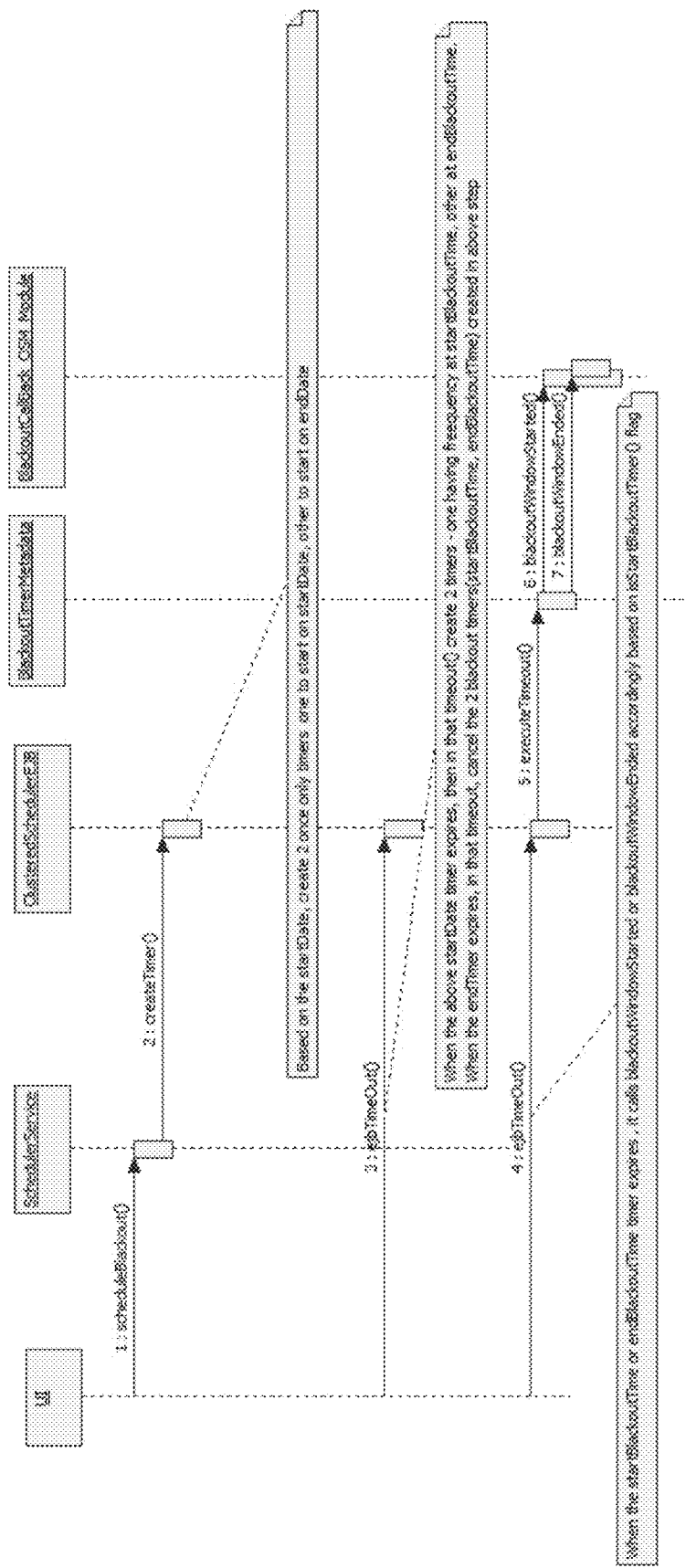
FIG. 34 illustrates a sequence diagram of the functionality of a timer method for scheduling a duration timer, in accordance with an embodiment.

FIG. 34 illustrates a sequence diagram of the functionality of a timer method for scheduling a duration timer, in accordance with an embodiment. The sequence diagram includes components "UI," "SchedulerService," "ClusteredSchedulerEJB," "BlackoutlTimerMetaData," and "BlackoutCallback OSM Module" and illustrates the interactions between these components to schedule a duration timer. UI is a user interface and ClusteredSchedulerEJB is an EJB component that is cluster-aware. BlackoutTimerMetaData is a schedule configuration provided by an OSM Module to the SchedulerService for scheduling blackout intervals. BlackoutCallback OSM Module is a callback event on the OSM Module from the SchedulerService to tell the OSM Module that a blackout has started, has ended, is starting, or is ending.

Figure 35:
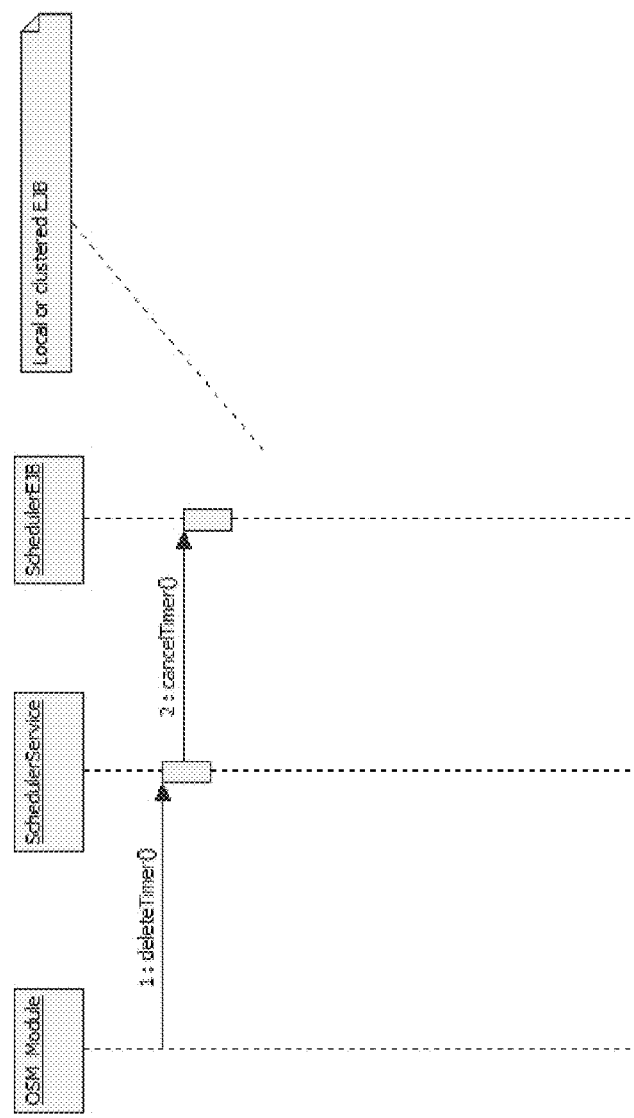
FIG. 35 illustrates a sequence diagram of the functionality of a timer method for cancelling a local or clustered timer, in accordance with an embodiment.

FIG. 35 illustrates a sequence diagram of the functionality of a timer method for cancelling a local or clustered timer, in accordance with an embodiment. The sequence diagram includes components OSM Module, SchedulerService, and SchedulerEJB and illustrates the interactions between these components to cancel a local or clustered timer.

Figure 36:
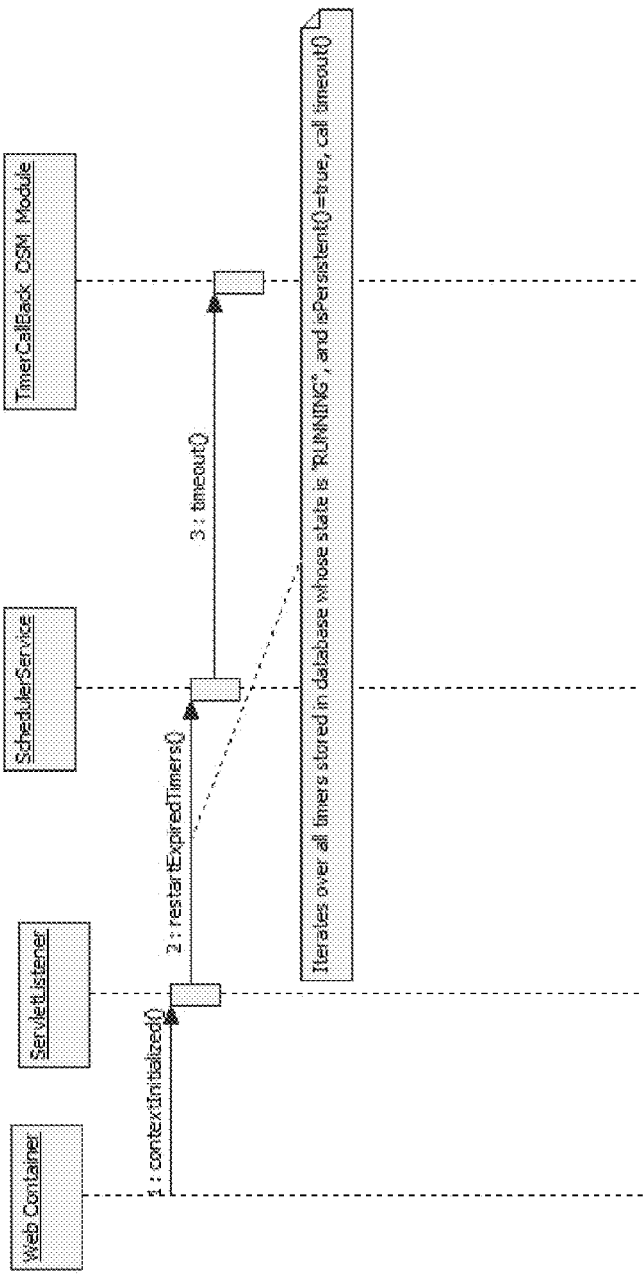
FIG. 36 illustrates a sequence diagram of the functionality of a timer method for restarting local and/or clustered timers, in accordance with an embodiment.

FIG. 36 illustrates a sequence diagram of the functionality of a timer method for restarting local and/or clustered timers, in accordance with an embodiment. The sequence diagram includes components "Web Container," "ServletListener," SchedulerService, and TimerCallback OSM Module and illustrates the interactions between these components to restart local and/or clustered timers. Web Container manages the lifecycle of servlets, mapping a Uniform Resource Locator ("URL") to a particular servlet and ensuring the URL requester has the correct access rights. ServletListener receives notification events about servlet lifecycle changes.

As disclosed, embodiments comprise a system that automatically detects when an order is not going to be able to be processed in accordance with applicable service level agreements ("SLAs") and is therefore in jeopardy. The system permits SLAs and other jeopardy conditions to be defined as jeopardy management policies in a flexible manner such that a jeopardy condition (e.g., an SLA) can be defined by: orders that match criteria {W} must reach one of the states in set {X} from state {Z} within {Y} duration/threshold. The system provides a graphical user interface for designing, configuring, and deploying such jeopardy management policies which can also include user or system configured jeopardy plugins. The system can take action in accordance with such jeopardy management policies to notify interested parties and/or initiate corrective actions to rectify problems such that further jeopardy conditions (e.g., SLA violations) are avoided. Furthermore, the system employs an optimized timer scheduling method that improves the functioning of the system to more efficiently poll for potential orders in jeopardy.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to, execute a method, comprising:
receiving an extensible markup language (XML) file defining at least one service level agreement (SLA), wherein the SLA includes
a plurality of initial states,
a plurality of final states, and
a plurality of expected durations;
instantiating an Enterprise JavaBean (EJB) object representing the SLA based on the received XML file, the instantiating including instantiating a plurality of timers on a node in an EJB cluster, each of the timers having one of the plurality of the expected durations of the SLA and a current state selected from a plurality of timer states;

iterating through a set of order objects to compare a current state of each order object with an expected state defined by the SLA;

calculating a confidence level that each of the order objects will satisfy the SLA based on a current state of the order object and remaining states to be reached;

determining based on the confidence level that an order of the set of orders is expected to violate the SLA even when a violation has not yet occurred;

generating, responsive to the determining, a notification indicating that the order object is expected to violate the SLA;

initiating a corrective action including modifying the order object; and updating a current state of the instantiated timers based on the modified order object from the corrective action.

2. The non-transitory computer readable medium of claim 1, wherein the SLA comprises one or more skipped states; and wherein the determining includes not applying a time threshold during a period of time that the order object is in one of the skipped states.

3. The non-transitory computer readable medium of claim 1, wherein the method further comprises:

transmitting the generated notification to a notification recipient.

4. The non-transitory computer readable medium of claim 3, wherein the notification recipient is a messaging system and the generated notification is sent to a message queue of the messaging system.

5. The non-transitory computer readable medium of claim 1, wherein the determining includes evaluating whether one or more orders represented by the order objects is in jeopardy using a timing method, the timing method comprising:

determining, at a predetermined interval, whether any orders are to be evaluated for potential jeopardy;

evaluating up to a predetermined maximum batch number of the orders to be evaluated to determine whether such orders are in jeopardy; and when the number of orders to be evaluated exceeds the predetermined maximum batch number, scheduling, at a predetermined delay less than the predetermined interval, a timer to evaluate the unevaluated orders exceeding the predetermined maximum batch number.

6. The non-transitory computer readable medium of claim 1, wherein the determining includes evaluating whether one or more orders represented by the order objects is in jeopardy using a scheduling method, the scheduling method comprising:

determining a next order jeopardy condition that is earliest to expire from a plurality of order jeopardy conditions;

scheduling a timer as a current timer based on the next order jeopardy condition;

cancelling, when a new order jeopardy condition has been created with an expiration date that is earlier than the expiration date of the next order jeopardy condition, the timer and scheduling a new timer as the current timer corresponding to the new order jeopardy condition;

cancelling, when an order jeopardy condition corresponding to the current timer is completed prior to the expiration of the current timer, the current timer and repeating the determining the next order jeopardy condition; and selecting, when the current timer goes off, expired order jeopardy conditions from the plurality of order jeopardy conditions to be evaluated for potential jeopardy.

7. The non-transitory computer readable medium of claim 1, wherein the plurality of timer states includes stopped, running, paused, timed-out, and postponed.

8. A non-transitory computer-implemented method for managing order jeopardy, the computer-implemented method comprising:

receiving an extensible markup language (XML) file defining at least one service level agreement (SLA), wherein the SLA includes
a plurality of initial states,
a plurality of final states, and
a plurality of expected durations;

instantiating an Enterprise JavaBean (EJB) object representing the SLA, the instantiating including instantiating a plurality of timers on a node in an EJB cluster, each of the timers having one of the plurality of the expected durations of the SLA and a current state selected from a plurality of timer states;

iterating through a set of order objects to compare a current state of each order object with an expected state defined by the SLA;

calculating a confidence level that each of the order objects will satisfy the SLA based on a current state of the order object and remaining states to be reached;

determining based on the confidence level that an order of the set of orders is expected to violate the SLA even when a violation has not yet occurred;

generating, responsive to the determining, a notification indicating that the order object is expected to violate the SLA;

initiating a corrective action including modifying the order object; and updating a current state of the instantiated timers based on the modified order object from the corrective action.

9. The computer implemented method of claim 8, further comprising:

transmitting the generated notification to a notification recipient, the notification recipient being a messaging system, the transmitting including sending the generated notification to a message queue of the messaging system.

10. The computer implemented method of claim 8, wherein the determining includes evaluating whether one or more orders represented by the order objects is in jeopardy using a timing method, the timing method comprising:

determining, at a predetermined interval, whether any orders are to be evaluated for potential jeopardy;

evaluating up to a predetermined maximum batch number of the orders to be evaluated to determine whether such orders are in jeopardy; and when the number of orders to be evaluated exceeds the predetermined maximum batch number, scheduling, at a predetermined delay less than the predetermined interval, a timer to evaluate the unevaluated orders exceeding the predetermined maximum batch number.

11. The computer implemented method of claim 8, wherein the determining includes evaluating whether one or more orders represented by the order objects is in jeopardy using a scheduling method, the scheduling method comprising:

determining a next order jeopardy condition that is earliest to expire from a plurality of order jeopardy conditions;

scheduling a timer as a current timer based on the next order jeopardy condition;

cancelling, when a new order jeopardy condition has been created with an expiration date that is earlier than the expiration date of the next order jeopardy condition, the timer and scheduling a new timer as the current timer corresponding to the new order jeopardy condition;

cancelling, when an order jeopardy condition corresponding to the current timer is completed prior to the expiration of the current timer, the current timer and repeating the determining the next order jeopardy condition; and selecting, when the current timer goes off, expired order jeopardy conditions from the plurality of order jeopardy conditions to be evaluated for potential jeopardy.

12. The method of claim 8, wherein the plurality of timer states includes stopped, running, paused, timed-out, and postponed.

13. A system comprising:
a memory device configured to store an order management module;
a processing device in communication with the memory device, the processing device configured to execute the order management module stored in the memory device to manage orders processed by the system, the managing comprising:
receiving an extensible markup language (XML) file defining at least one service level agreement (SLA), wherein the SLA includes
a plurality of initial states,
a plurality of final states, and
a plurality of expected durations;
instantiating an Enterprise JavaBean (EJB) object representing the SLA, the instantiating including instantiating a plurality of timers on a node in an EJB cluster, each of the timers having one of the plurality of the expected durations of the SLA and a current state selected from a plurality of timer states;
iterating through a set of order objects to compare a current state of each order object with an expected state defined by the SLA;
calculating a confidence level that each of the order objects will satisfy the SLA based on a current state of the order object and remaining states to be reached;
determining based on the confidence level that an order of the set of orders is expected to violate the SLA even when a violation has not yet occurred;

generating, responsive to the determining, a notification indicating that the order object is expected to violate the SLA;

initiating a corrective action including modifying the order object; and updating a current state of the instantiated timers based on the modified order object from the corrective action.

14. The system of claim 13, wherein the determining includes evaluating whether one or more orders represented by the order objects stored in the memory device is in jeopardy, including:
determining, at a predetermined interval, whether any orders are to be evaluated for potential jeopardy;
evaluating up to a predetermined maximum batch number of the orders to be evaluated to determine whether such orders are in jeopardy; and
when the number of orders to be evaluated exceeds the predetermined maximum batch number, scheduling, at a predetermined delay less than the predetermined interval, a timer to evaluate the unevaluated orders exceeding the predetermined maximum batch number.

15. The system of claim 13, wherein the determining includes evaluating whether one or more orders represented by the order objects stored in the memory device is in jeopardy, including:
determining a next order jeopardy condition that is earliest to expire from a plurality of order jeopardy conditions;
scheduling a timer as a current timer based on the next order jeopardy condition;
cancelling, when a new order jeopardy condition has been created with an expiration date that is earlier than the expiration date of the next order jeopardy condition, the timer and scheduling a new timer as the current timer corresponding to the new order jeopardy condition;
cancelling, when an order jeopardy condition corresponding to the current timer is completed prior to the expiration of the current timer, the current timer and repeating the determining the next order jeopardy condition; and
selecting, when the current timer goes off, expired order jeopardy conditions from the plurality of order jeopardy conditions to be evaluated for potential jeopardy.

16. The system of claim 13, wherein the plurality of timer states includes stopped, running, paused, timed-out, and postponed.

* * * * *

UNITED STATES PATENT AND TRADEMARK OFFICE
CERTIFICATE OF CORRECTION

PATENT NO. : 10,015,078 B2
APPLICATION NO. : 14/600169
DATED : July 3, 2018
INVENTOR(S) : Dueck et al.

It is certified that error appears in the above-identified patent and that said Letters Patent is hereby corrected as shown below:

On the Title Page

Column 1, under Inventors, Line 4, delete "Thronhill" and insert -- Thornhill --, therefor.

In the Drawings

On sheet 6 of 38, in Fig. 5, under Reference Numeral 500, Line 3, delete "reachs" and insert -- reaches --, therefor.

On sheet 6 of 38, in Fig. 5, under Reference Numeral 500, Line 5, delete "reachs" and insert -- reaches --, therefor.

On sheet 6 of 38, in Fig. 5, under Reference Numeral 500, Line 6, delete "reachs" and insert -- reaches --, therefor.

On sheet 6 of 38, in Fig. 5, under Reference Numeral 500, Line 8, delete "reachs" and insert -- reaches --, therefor.

On sheet 7 of 38, in Fig. 6, under Reference Numeral 604, Line 4, delete "notificaiton" and insert -- notification --, therefor.

In the Specification

In Column 1, Line 48, delete "jeopardy" and insert -- jeopardy. --, therefor.

In Column 9, Line 12, delete "one;" and insert -- one. --, therefor.

In Column 10, Lines 58-59, delete "getTimerPostponedCount( )" and insert -- getTimerPostponedCount( ), --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*